US012172296B2

(12) United States Patent
Azuma et al.

(10) Patent No.: US 12,172,296 B2
(45) Date of Patent: Dec. 24, 2024

(54) HOLDING DEVICE AND ROBOT PROVIDED WITH SAME

(71) Applicant: Kawasaki Jukogyo Kabushiki Kaisha, Kobe (JP)

(72) Inventors: Kentaro Azuma, Kobe (JP); Takayuki Ishizaki, Kobe (JP); Masataka Yoshida, Kobe (JP); Mitsunobu Oka, Kobe (JP); Satoshi Kamata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 690 days.

(21) Appl. No.: 17/601,429

(22) PCT Filed: Apr. 6, 2020

(86) PCT No.: PCT/JP2020/015445
§ 371 (c)(1),
(2) Date: Oct. 5, 2021

(87) PCT Pub. No.: WO2020/204202
PCT Pub. Date: Oct. 8, 2020

(65) Prior Publication Data
US 2022/0193929 A1    Jun. 23, 2022

(30) Foreign Application Priority Data

Apr. 5, 2019    (JP) .................................. 2019-072502

(51) Int. Cl.
*B25J 15/00*    (2006.01)
*B25J 15/06*    (2006.01)
(Continued)

(52) U.S. Cl.
CPC ....... *B25J 15/0004* (2013.01); *B25J 15/0052* (2013.01); *B25J 15/0616* (2013.01);
(Continued)

(58) Field of Classification Search
CPC ................ B25J 15/0004; B25J 15/0052; B25J 15/0253; B25J 15/026; B25J 15/0616
(Continued)

(56) References Cited

U.S. PATENT DOCUMENTS 7,828,351 B2 * 11/2010 Baumstimler ......... B65G 47/90
198/468.4
9,499,287 B2 * 11/2016 Koure ..................... B65B 23/02
(Continued)

FOREIGN PATENT DOCUMENTS

DE    112017005095 T5    8/2019
JP    H04-266331 A    9/1992
(Continued)

*Primary Examiner* — Dean J Kramer
(74) *Attorney, Agent, or Firm* — XSENSUS LLP

(57) ABSTRACT

A holding device capable of reliably holding a workpiece with a simple operation. The holding device is for holding a workpiece and includes a base part; a guide member mounted on the base part and extending in a first direction; and a first holding mechanism movable in the first direction by an external force being applied thereto, the first holding mechanism being capable of holding the workpiece. Further, there is a second holding mechanism including a first member and a second member which face each other across the first holding mechanism in the first direction and each of which is movable relative to the base part by being driven by an actuator. The second holding mechanism is capable of sandwiching and holding the workpiece between the first member and the second member by changing a distance between the first member and the second member in the first direction.

6 Claims, 13 Drawing Sheets

(51) Int. Cl.
*B25J 15/08* (2006.01)
*B25J 19/00* (2006.01)
*B25J 15/02* (2006.01)

(52) U.S. Cl.
CPC ........... *B25J 15/08* (2013.01); *B25J 19/0025* (2013.01); *B25J 15/026* (2013.01)

(58) Field of Classification Search
USPC .................................................. 294/2, 86.4
See application file for complete search history.

(56) References Cited

U.S. PATENT DOCUMENTS

| | | |
|---|---|---|
| 2005/0008469 A1 | 1/2005 | Jung |
| 2006/0045721 A1* | 3/2006 | de Koning ............. B65G 47/91 414/751.1 |
| 2008/0000203 A1* | 1/2008 | Gilmore ............... B25J 15/0616 53/475 |
| 2019/0240846 A1 | 8/2019 | Tanahashi et al. |
| 2020/0039090 A1 | 2/2020 | Bando et al. |

FOREIGN PATENT DOCUMENTS

| | | | |
|---|---|---|---|
| JP | 5-293784 | A | 11/1993 |
| JP | 9-141588 | A | 6/1997 |
| JP | 2005-28565 | A | 2/2005 |
| JP | 4891251 | B2 | 3/2012 |
| JP | 2013-39644 | A | 2/2013 |
| JP | 6223631 | B1 | 11/2017 |
| KR | 101305171 | B1 * | 9/2013 |

* cited by examiner

HOLDING DEVICE AND ROBOT PROVIDED WITH SAME

CROSS-REFERENCE TO RELATED APPLICATIONS

The present application is based on PCT filing PCT/JP2020/015445, filed Apr. 6, 2020, which claims priority to JP 2019-072502, filed Apr. 5, 2019, the entire contents of each are incorporated herein by reference.

TECHNICAL FIELD

The present invention relates to a holding device for holding a workpiece and a robot including the holding device.

BACKGROUND ART

Conventionally, a holding device for holding a workpiece has been known. As such a holding device, for example, there is a robot hand of PTL 1.

In the robot hand of PTL 1, first, a suction cup is lowered by a raising and lowering actuator, and then the suction cup is turned on to suck a workpiece. Next, claws are closed by an opening and closing actuator while raising the suction cup by the raising and lowering actuator. At this time, as the two claws move to an axis, corners of the workpiece are guided by V-shaped grooves of the two claws, and the position of the workpiece is corrected. Then, with the two claws closed, the suction cup is once turned off to release the workpiece, is set correctly, and then is turned on again, whereby the workpiece is reliably held.

CITATION LIST

Patent Literature

PTL 1: Japanese Laid-Open Patent Publication No. H5-293784

SUMMARY OF INVENTION

Technical Problem

PTL 1 proposes reliably holding a workpiece by the robot hand including two holding mechanisms (that is, a suction cup capable of sucking and holding a workpiece, and two claws capable of sandwiching and holding a workpiece therebetween). However, the robot hand of PTL 1 needs to perform a complicated operation in order to hold a workpiece as described above.

Therefore, an object of the present invention is to provide a holding device capable of reliably holding a workpiece with a simple operation, and a robot including the holding device.

Solution to Problem

In order to solve the above problem, a holding device according to the present invention is a holding device for holding a workpiece, including: a base part; a guide member mounted on the base part and extending in a first direction; a first holding mechanism movable in the first direction, while being guided by the guide member, by an external force being applied thereto, the first holding mechanism being capable of holding the workpiece; and a second holding mechanism including a first member and a second member which face each other across the first holding mechanism in the first direction and each of which is movable relative to the base part by being driven by an actuator, the second holding mechanism being capable of sandwiching and holding the workpiece between the first member and the second member by changing a distance between the first member and the second member in the first direction.

According to the above configuration, by decreasing the distance between the first member and the second member after the first holding mechanism holds a workpiece, an external force along the first direction is applied to the first holding mechanism via the workpiece by either one of the first member and the second member. Then, the first holding mechanism integrally moves with the above either one of the members and the workpiece while being guided by the guide member which extends in the first direction. Accordingly, regardless of which portion of the workpiece is held by the first holding mechanism, the workpiece can be sandwiched and held by the second holding mechanism, by decreasing the distance between the first member and the second member while keeping a state where the first holding mechanism holds the workpiece. As a result, the holding device according to the present invention is capable of reliably holding the workpiece with a simple operation.

The holding device may include: a third member integrally movable with the first member and disposed between the first holding mechanism and the second member in the first direction; and a fourth member integrally movable with the second member and disposed between the first holding mechanism and the first member in the first direction. When the distance between the first member and the second member is a maximum distance, the third and fourth members may position the first holding mechanism in the first direction by holding the first holding mechanism, and when the distance between the first member and the second member becomes smaller than the maximum distance, the third and fourth members may release the first holding mechanism from the positioned state.

According to the above configuration, the distance between the first member and the second member is caused to be the maximum distance, and then work of holding the workpiece by the first holding mechanism is performed, whereby it is possible to inhibit the first member and the second member from colliding against the workpiece while preventing the first holding mechanism from moving in the first direction, since the first holding mechanism has been positioned. Furthermore, after the workpiece is held by the first holding mechanism, the distance between the first member and the second member is made smaller than the maximum distance, whereby work of sandwiching and holding the workpiece between the first member and the second member can be performed while releasing the first holding mechanism from the positioned state. Accordingly, it is possible to efficiently perform work of sandwiching and holding the workpiece by the second holding mechanism while keeping a state where the workpiece is held by the first holding mechanism.

The first holding mechanism may be capable of coming into contact with an upper portion of the workpiece and holding the workpiece, and the second holding mechanism may be capable of sandwiching and holding the workpiece by bringing the first member into contact with a first portion, of a side portion of the workpiece, located on one side in the first direction, and bringing the second member into contact with a second portion, of the side portion of the workpiece, located on another side in the first direction.

According to the above configuration, it is possible to more reliably hold the workpiece by the first holding mechanism and the second holding mechanism.

For example, the first holding mechanism may be capable of sucking and holding the workpiece with negative pressure.

The first holding mechanism may include an extending and retracting part capable of extending and retracting in a second direction orthogonal to the first direction, and a holding part, provided at a distal end of the extending and retracting part, for holding the workpiece, and the first holding mechanism may be configured such that when the extending and retracting part is in a retracted state, a distal end of the holding part is located on a proximal end side with respect to distal ends of the first and second members, and when the extending and retracting part is in an extended state, the distal end of the holding part is located on a distal end side with respect to the distal ends of the first and second members.

According to the above configuration, even when another object exists adjacent to a workpiece, it is possible to reliably hold the workpiece with a simple operation without being hindered by the other object.

In order to solve the above problem, a robot according to the present invention includes any of the holding devices described above and a robot arm including at least one joint shaft and having a distal end at which the holding device is provided.

According to the above configuration, since any of the holding devices described above is included, it is possible to reliably hold the workpiece with a simple operation.

For example, a first servomotor for rotationally driving the at least one joint shaft may be provided at the at least one joint shaft, the actuator for driving the first and second members may be configured as a second servomotor, and the robot may further include a robot control device for servo-controlling the first and second servomotors.

Advantageous Effects of Invention

According to the present invention, it is possible to provide a holding device capable of reliably holding a workpiece with a simple operation, and a robot including the holding device.

BRIEF DESCRIPTION OF DRAWINGS

FIG. 4 illustrates cross-sectional views of the holding device according to the embodiment of the present invention.

FIG. 5 illustrates cross-sectional views of the holding device according to the embodiment of the present invention.

FIG. 6 illustrates schematic diagrams showing a state where work of holding a corrugated cardboard box by the holding device according to the embodiment of the present invention is performed.

FIG. 7 illustrates schematic diagrams showing a state where the work of holding the corrugated cardboard box by the holding device according to the embodiment of the present invention is performed.

FIG. 9 illustrates schematic diagrams showing a state where work of holding a corrugated cardboard box by the holding device according to the embodiment of the present invention is performed in another mode.

FIG. 11 illustrates schematic diagrams showing a state where work of holding a corrugated cardboard box by the first modification of the holding device according to the embodiment of the present invention is performed.

FIG. 12 illustrates schematic diagrams of a state where work of holding a corrugated cardboard box by a second modification of the holding device according to the embodiment of the present invention is performed, as seen from the distal end side of the holding device.

DESCRIPTION OF EMBODIMENTS

Figure 1:
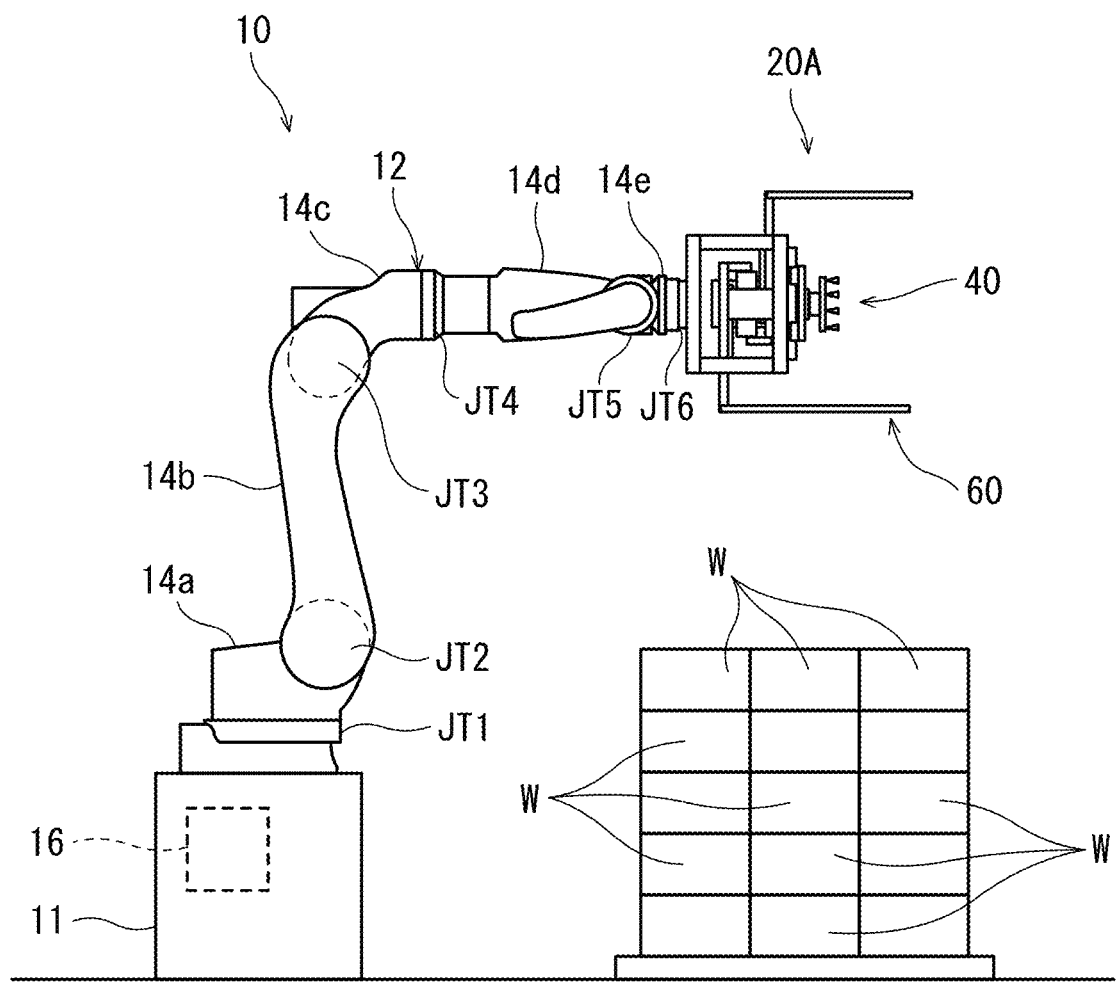
FIG. 1 is a schematic diagram showing a state where a holding device according to an embodiment of the present invention is applied to a site for transferring corrugated cardboard boxes.

Hereinafter, a holding device according to an embodiment of the present invention will be described with reference to the accompanying drawings. The present invention is not limited by the present embodiment. In addition, in the following, the same or corresponding elements are denoted by the same reference characters in all the drawings and such elements are not repeatedly described.

FIG. 1 is a schematic diagram showing a state where the holding device according to the present embodiment is applied to a site for transferring corrugated cardboard boxes.

As shown in FIG. 1, a holding device 20A according to the present embodiment is applied to and used in a site for transferring corrugated cardboard boxes W (workpieces) having a rectangular parallelepiped shape. Specifically, the holding device 20A is configured as a hand of a robot 10 for repeatedly performing work of holding and transferring a corrugated cardboard box W located at the uppermost stage from a plurality of stacked corrugated cardboard boxes W.
(Robot 10)

The robot 10 includes a base 11, a robot arm 12 which is coupled at a proximal end portion thereof to the base 11, the holding device 20A which is mounted on the distal end of the robot arm 12, and a robot control device 16 for controlling the operation of the robot arm 12 and the holding device 20A.
(Robot arm 12)

As shown in FIG. 1, the robot arm 12 is configured as a vertical articulated robot including six joint shafts JT1 to JT6 and six links 14a to 14e sequentially coupled by the joint shafts JT1 to JT6. The joint shafts JT1 to JT6 are driven by servomotors 15a to 15f (first servomotors), respectively (see FIG. 2).

The joint shaft JT1 couples the base 11 and a proximal end portion of the link 14a such that the base 11 and the proximal end portion of the link 14a are rotatable about an axis extending in the vertical direction. The joint shaft JT2 couples a distal end portion of the link 14a and a proximal end portion of the link 14b such that the distal end portion of the link 14a and the proximal end portion of the link 14b are rotatable about an axis extending in the horizontal direction. The joint shaft JT3 couples a distal end portion of the link 14b and a proximal end portion of the link 14c such that the distal end portion of the link 14b and the proximal end portion of the link 14c are rotatable about an axis extending in the horizontal direction.

The joint shaft JT4 couples a distal end portion of the link 14c and a proximal end portion of the link 14d such that the distal end portion of the link 14c and the proximal end portion of the link 14d are rotatable about an axis extending in the longitudinal direction of the link 14c. The joint shaft JT5 couples a distal end portion of the link 14d and a proximal end portion of the link 14e such that the distal end portion of the link 14d and the proximal end portion of the link 14e are rotatable about an axis extending in a direction orthogonal to the longitudinal direction of the link 14d. The joint shaft JT6 twistably and rotatably couples a distal end portion of the link 14e and a proximal end portion of the holding device 20.
(Robot Control Device 16)

Figure 2:
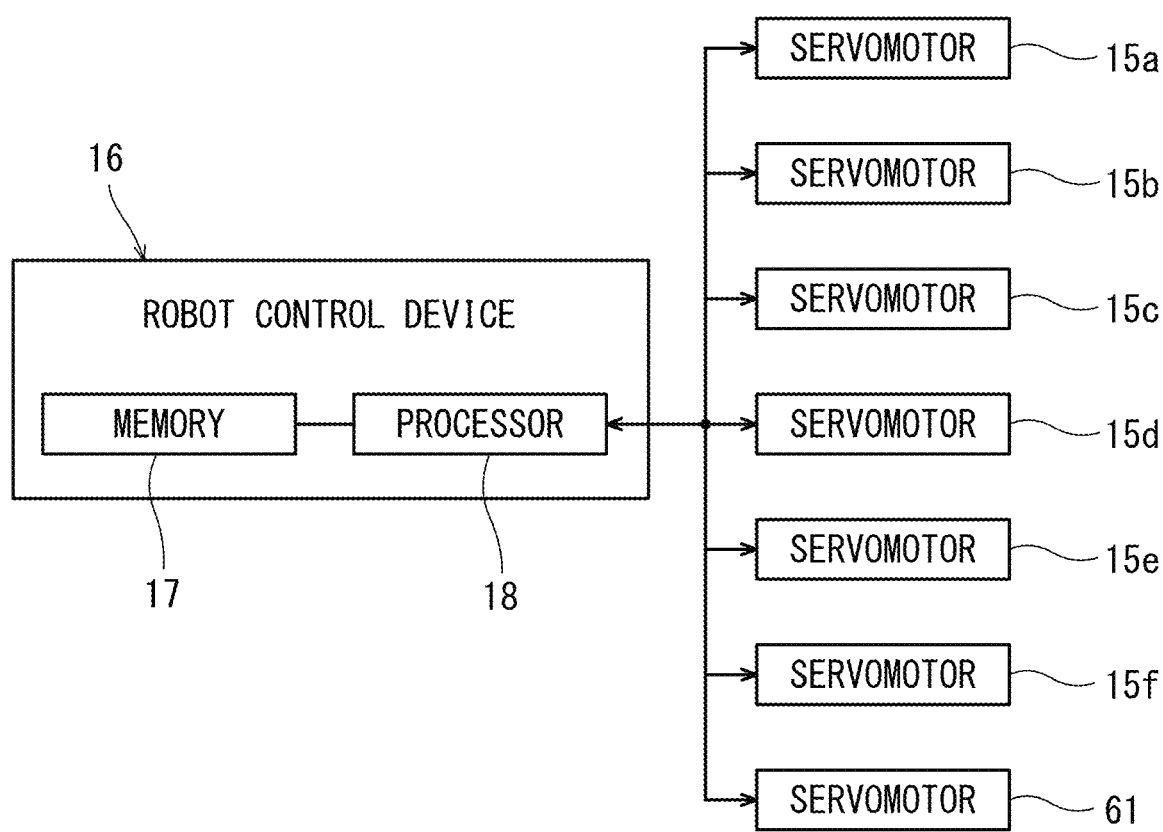
FIG. 2 is a block diagram showing a control system of a robot including the holding device according to the embodiment of the present invention.

FIG. 2 is a block diagram showing a control system of the robot including the holding device according to the present embodiment. As shown in FIG. 2, the robot control device 16 includes a memory 17 for storing a program, and a processor 18 for executing the program stored in the memory 17. The robot control device 16 can control the operation of the robot arm 12 by servo-controlling the servomotors 15a to 15f which are provided at the joint shafts JT1 to JT6, respectively. In addition, the robot control device 16 can control the operation of the holding device 20A by servo-controlling a servomotor 61 of a second holding mechanism 60, which will be described later. Furthermore, the robot control device 16 may control the operation of an air cylinder 42, which will be described later.

The robot control device 16 compares command values and feedback values of the servomotors 15a to 15f, which are provided at the robot arm 12, and the servomotor 61, which is provided at the second holding mechanism 60, and controls the operation of the servomotors 15a to 15f and 61 in accordance with the comparison. At this time, for example, the command values and the feedback values may include the respective rotation positions, the respective rotation speeds, and the respective current values of the servomotors 15a to 15f and 61.
(Holding Device 20A)

Figure 3:
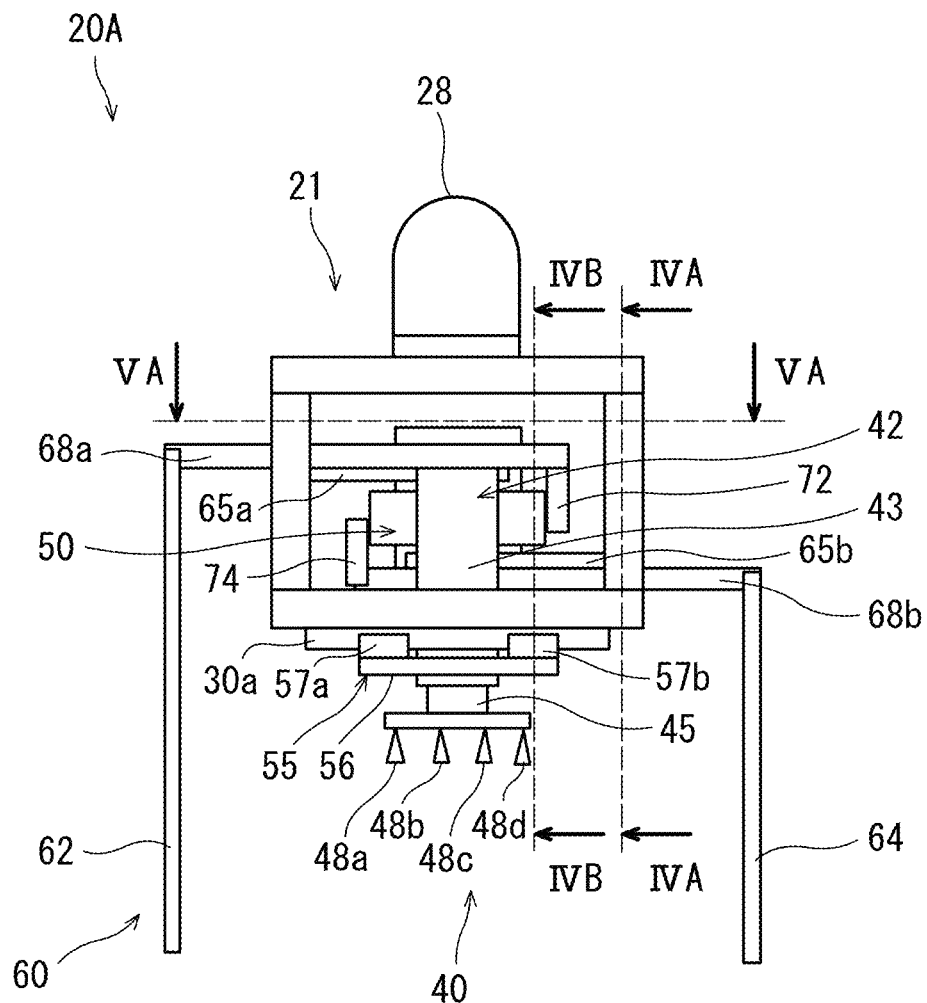
FIG. 3 is a front view showing the holding device according to the embodiment of the present invention.
Figure 3:
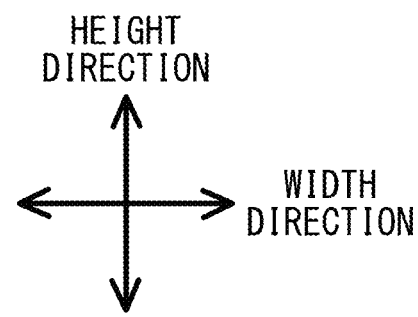
Figure 4A:
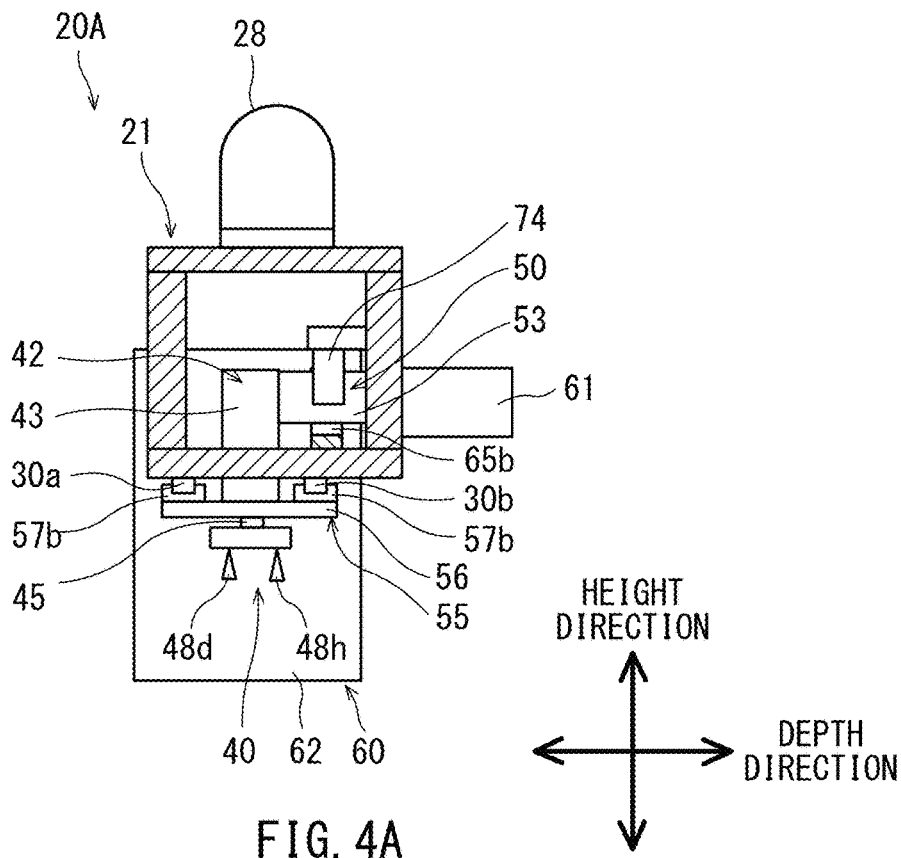
FIG. 4(A) is a cross-sectional view taken along a line IVA-IVA shown in FIG. 3.
Figure 4B:
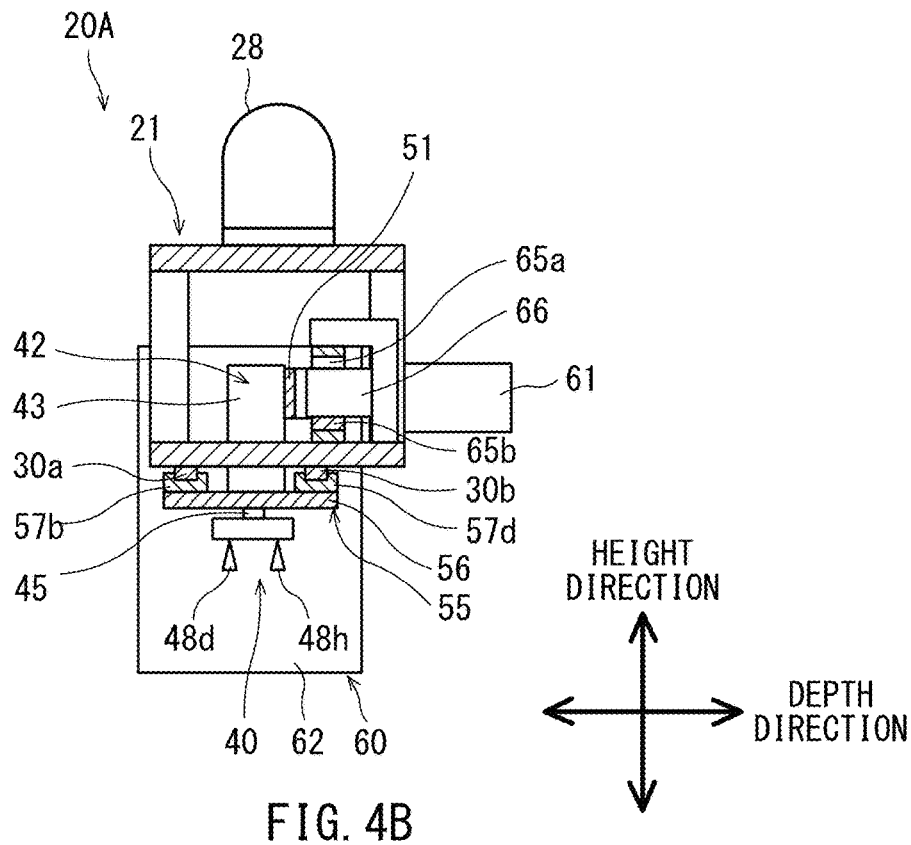
FIG. 4(B) is a cross-sectional view taken along a line IVB-IVB shown in FIG. 3.
Figure 5A:
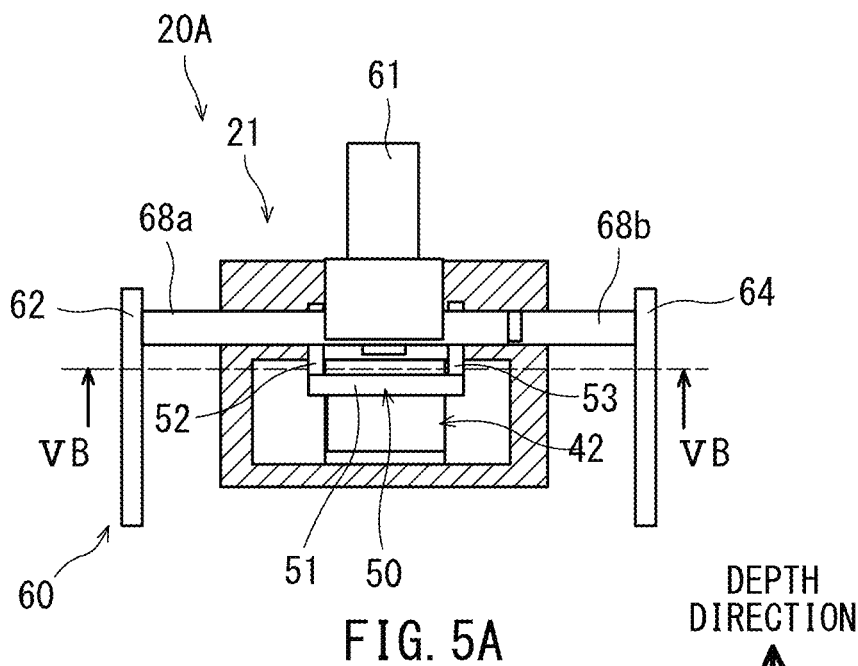
FIG. 5(A) is a cross-sectional view taken along a line VA-VA shown in FIG. 3.
Figure 5B:
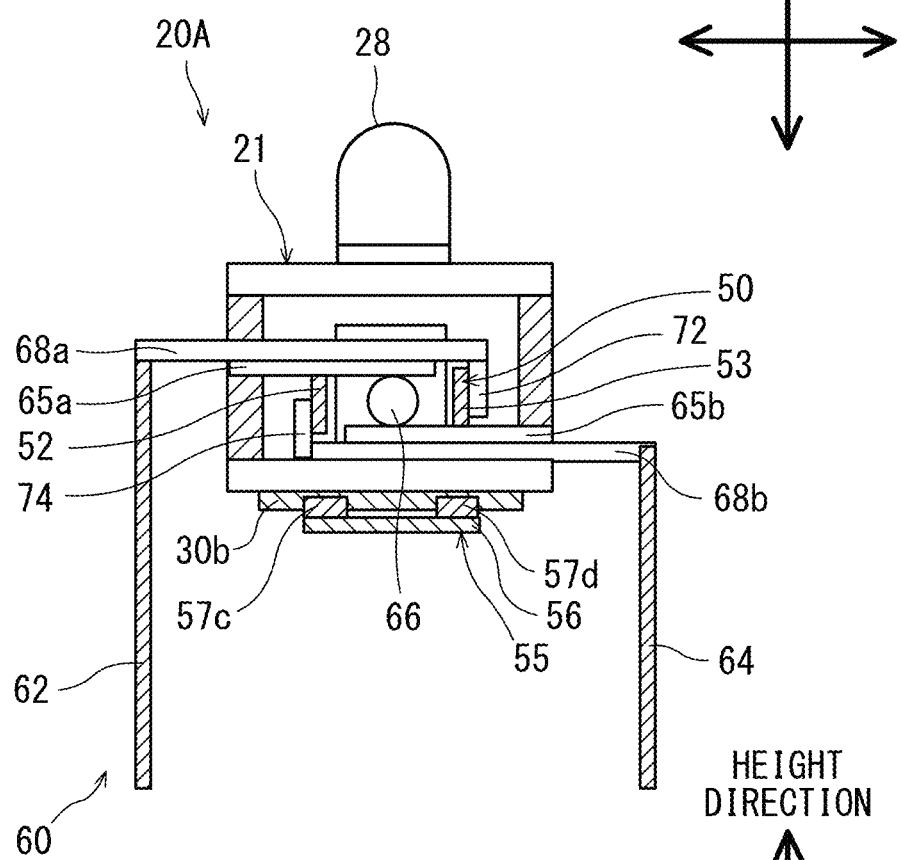
FIG. 5(B) is a cross-sectional view taken along a line VB-VB shown in FIG. 5(A).

FIG. 3 is a front view showing the holding device according to the present embodiment. FIG. 4 illustrates cross-sectional views of the holding device, FIG. 4(A) is a cross-sectional view taken along a line IVA-IVA shown in FIG. 3, and FIG. 4(B) is a cross-sectional view taken along a line IVB-IVB shown in FIG. 3. FIG. 5 illustrates cross-sectional views of the holding device, FIG. 5(A) is a cross-sectional view taken along a line VA-VA shown in FIG. 3, and FIG. 5(B) is a cross-sectional view taken along a line VB-VB shown in FIG. 5(A).

As shown in FIGS. 3 to 5, the holding device 20A according to the present embodiment includes a base part 21, guide members 30a and 30b which are mounted on the base part 21 and which extend in a width direction (first direction), a first holding mechanism 40 which is mounted on the guide members 30a and 30b and which is capable of sucking and holding a corrugated cardboard box W with negative pressure, and the second holding mechanism 60 capable of sandwiching and holding a corrugated cardboard box W.

In the following description, a direction connecting a first member 62 and a second member 64, which will be described later, is referred to as a width direction or a right-left direction (first direction), a direction that is orthogonal to the width direction and in which the air cylinder 42, which will be described later, extends and retracts is referred to as a height direction or an up-down direction (second direction), and a direction orthogonal to the width direction and the height direction is referred to as a depth direction.
(Base Part 21)

The base part 21 is formed in a hollow rectangular parallelepiped shape, and an opening is formed in each of the five surfaces other than the upper surface of the rectangular parallelepiped shape. In addition, an attachment part 28 which is attached to the distal end of the robot arm 12 is provided at the center of the upper surface of the base part 21 so as to project therefrom.
(Guide Members 30a and 30b)

The guide members 30a and 30b are mounted on the bottom surface of the base part 21 so as to be parallel to each other and extend in the width direction from a left end portion to a right end portion of the bottom surface of the base part 21. The guide member 30a is mounted on a front portion of the bottom surface of the base part 21, and the guide member 30b is mounted on a rear portion of the bottom surface of the base part 21. Each of the guide members 30a and 30b is disposed so as to extend between the first member 62 and the second member 64, which will be described later, in the width direction (that is, such that the first member 62 and the second member 64, which will be described later, face each other across the guide members 30a and 30b in the width direction).
(First Holding Mechanism 40)

The first holding mechanism 40 includes the air cylinder 42 (extending and retracting part) which is disposed so as to extend in the height direction, and suction pads 48a to 48h (suction pads 48e to 48g are not shown; holding part) which are provided at the distal end of the air cylinder 42 and which are capable of holding a corrugated cardboard box W by sucking the upper surface of the corrugated cardboard box W with negative pressure (coming into contact with an upper portion of the workpiece).

The air cylinder 42 includes a cylinder body 43 which is formed in a hollow cylindrical shape, and a piston 45 which is mounted on the cylinder body 43 and which is capable of reciprocating in the height direction. The cylinder body 43 is disposed at the center of the base part 21 when viewed in the height direction (that is, at a position overlapping the attachment part 28, which is provided on the upper surface of the base part 21 so as to project therefrom, when viewed in the height direction). In addition, the cylinder body 43 is disposed such that a portion thereof from a proximal end portion to a portion closer to a distal end portion extends inside the base part 21 in the height direction and the distal end portion thereof projects from the opening formed in the bottom surface of the base part 21 to the lower side of the base part 21.

The air cylinder 42 has a known structure in which the length by which the piston 45 projects from the bottom surface of the cylinder body 43 is changed by the piston 45 reciprocating in the height direction. Accordingly, the air cylinder 42 has a structure in which the air cylinder 42 is capable of extending and retracting in the height direction, as a whole.

The first holding mechanism 40 is configured such that the distal ends of the suction pads 48a to 48h are located on the proximal end side with respect to the respective distal ends of the first member 62 and the second member 64, which will be described later, when the piston 45 of the air cylinder 42 is in a retracted state (see FIG. 3, FIG. 4, FIG. 6(A), etc.). In addition, the first holding mechanism 40 is configured such that the distal ends of the suction pads 48a to 48h are located on the distal end side with respect to the respective distal ends of the first member 62 and the second member 64 when the piston 45 of the air cylinder 42 is in an extended state (see FIG. 6(B)).

The first holding mechanism 40 is fixed to a rear end portion of a proximal end portion of the cylinder body 43 (that is, a portion, of the cylinder body 43, which is disposed inside the base part 21), and further includes a to-be-held body 50 which has a substantially U-shape when viewed in the height direction. The to-be-held body 50 is held by a third member 72 and a fourth member 74 of the second holding mechanism 60, which will be described later.

The to-be-held body 50 includes a first plate-shaped member 51 having a front surface of which a center portion in the width direction is fixed to a rear end portion of the cylinder body 43, a second plate-shaped member 52 which is provided at one end edge in the width direction of the back surface of the first plate-shaped member 51 so as to project therefrom and extend rearward, and a third plate-shaped member 53 which is provided at the other end edge in the width direction of the back surface of the first plate-shaped member 51 so as to project therefrom and extend rearward. The to-be-held body 50 is open at a rear end edge thereof when viewed in the height direction.

A sliding body 55 which is slidable on the guide members 30a and 30b by an external force being applied thereto (in other words, passively) is fixed to a distal end portion of the cylinder body 43 (that is, a portion, of the cylinder body 43, which is disposed below the bottom surface of the base part 21). The sliding body 55 includes a main member 56 which is formed in a plate shape, and four sliding members 57a to 57d (the sliding member 57d is not shown) which are fixed to the upper surface of the main member 56.

The sliding member 57a is fixed to a corner formed by the front end edge and one end edge in the width direction of the upper surface of the main member 56, and the sliding member 57b is fixed to a corner formed by the front end edge and the other end edge in the width direction of the upper surface of the main member 56. In addition, the sliding member 57c is fixed to a corner formed by the rear end edge and one end edge in the width direction of the upper surface of the main member 56, and the sliding member 57d is fixed to a corner formed by the rear end edge and the other end edge in the width direction of the upper surface of the main member 56. Each of the sliding members 57a to 57d has a substantially U-shape when viewed in the width direction.

Each of the sliding members 57a and 57b is provided so as to wrap the guide member 30a from below when viewed in the width direction, and is slidable in the width direction while being guided by the guide member 30a. Meanwhile, each of the sliding members 57c and 57d is provided so as to wrap the guide member 30b from below when viewed in the width direction, and is slidable in the width direction while being guided by the guide member 30b.

As described above, each of the sliding members 57a to 57d is fixed to the upper surface of the one main member 56. Therefore, the sliding members 57a to 57d and the main member 56 (in other words, the sliding body 55) are integrally movable while being guided by the guide members 30a and 30b. Since the sliding body 55 is fixed to the cylinder body 43, the air cylinder 42 is integrally movable with the sliding body 55. Due to the above, the first holding mechanism 40 is movable in the width direction, while being guided by the guide members 30a and 30b, by an external force being applied thereto.

(Second Holding Mechanism 60)

The second holding mechanism 60 includes the first member 62 and the second member 64 which face each other across the first holding mechanism 40 in the width direction and which are movable relative to the base part 21 by being driven by the servomotor 61 (actuator or second servomotor).

Each of the first member 62 and the second member 64 is disposed such that the longitudinal direction of a main surface thereof coincides with the height direction of the holding device 20A, the width direction of the main surface thereof coincides with the depth direction of the holding device 20A, and the thickness direction thereof coincides with the width direction of the holding device 20A. The second holding mechanism 60 is capable of sandwiching and holding a corrugated cardboard box W between the first member 62 and the second member 64 by changing the distance between the first member 62 and the second member 64 in the width direction.

As shown in FIG. 4(B) and FIG. 5(B), the servomotor 61 is disposed such that a motor case thereof extends rearward from the back surface of the base part 21, and a rotation shaft (not shown) thereof extends inside the base part 21 from the opening formed in the back surface of the base part 21. A pinions 66 is mounted on the rotation shaft of the servomotor 61. Racks 65a and 65b are meshed with the pinions 66.

Specifically, the rack 65a is meshed with a portion on one side in the radial direction of the pinions 66 (here, an upper portion of the pinions 66). In addition, the rack 65b is meshed with a portion on the other side in the radial direction of the pinions 66 (here, a lower portion of the pinions 66). The second holding mechanism 60 is configured such that the racks 65a and 65b move to sides opposite to each other in the width direction when the pinions 66 is rotated by the servomotor 61.

The bottom surface of a intervening member 68a having a plate shape is fixed to the upper surface of the rack 65a. The intervening member 68a is disposed so as to extend inside the base part 21 in the width direction and project from the opening formed in a right side surface of the base part 21 (side surface located on the left side of the sheet of FIG. 3 in the front view of FIG. 3) to the outside of the base part 21. The first member 62 having a plate shape is provided at the distal end edge of a portion, of the intervening member 68a, which projects to the outside of the base part 21, so as to project therefrom and extend downward.

The upper surface of a intervening member 68b having a plate shape is fixed to the bottom surface of the rack 65b. The intervening member 68b is disposed so as to extend inside the base part 21 in the width direction and project from the opening formed in a left side surface of the base part 21 (side surface located on the right side of the sheet of FIG. 3 in the front view of FIG. 3) to the outside of the base part 21. The second member 64 having a plate shape is provided at the distal end edge of a portion, of the intervening member 68b, which projects to the outside of the base part 21, so as to project therefrom and extend downward.

With the above configuration, the second holding mechanism 60 can change the distance between the first member 62 and the second member 64 in the width direction by the pinion 65 being rotated by the servomotor 61. Accordingly, the second holding mechanism 60 is capable of sandwiching and holding a corrugated cardboard box W between the first member 62 and the second member 64.

Specifically, the second holding mechanism 60 is capable of sandwiching and holding a corrugated cardboard box W by bringing the first member 62 into contact with a right side surface of the corrugated cardboard box W (a first portion, of a side portion of the workpiece, which is located on one side in the first direction) and bringing the second member 64 into contact with a left side surface of the corrugated cardboard box W (a second portion, of the side portion of the workpiece, which is located on the other side in the first direction). The robot control device 16 may determine that work of sandwiching and holding the corrugated cardboard box W between the first member 62 and the second member 64 is completed, when a current value included in a feedback value from the servomotor 61 becomes larger than a predetermined current value.

The third member 72 having a plate shape is provided at the proximal end edge of a portion, of the intervening member 68a, which extends inside the base part 21, so as to project therefrom and extend downward. The third member 72 is disposed between the first holding mechanism 40 and the second member 64 in the width direction. Since the third member 72 is mounted on the first member 62 via the intervening member 68a, the third member 72 is integrally movable with the first member 62. The first member 62 and the third member 72 may be formed as separate members and fixed to the intervening member 68a. Alternatively, the first member 62, the third member 72, and the intervening member 68a may be integrally formed.

The fourth member 74 having a plate shape is provided at the proximal end edge of a portion, of the intervening member 68b, which extends inside the base part 21, so as to project therefrom and extend upward. The fourth member 74 is disposed between the first holding mechanism 40 and the first member 62 in the width direction. Since the fourth member 74 is mounted on the second member 64 via the intervening member 68a, the fourth member 74 is integrally movable with the second member 64. The second member 64 and the fourth member 74 may be formed as separate members and fixed to the intervening member 68b. Alternatively, the second member 64, the fourth member 74, and the intervening member 68b may be integrally formed.

The third member 72 and the fourth member 74 position the first holding mechanism 40 at the center in the width direction of the base part 21 by holding the to-be-held body 50 (by holding the first holding mechanism) therebetween when the distance between the first member 62 and the second member 64 is the maximum distance (see FIG. 3, etc.). In addition, the third member 72 and the fourth member 74 release the first holding mechanism 40 from the positioned state when the distance between the first member 62 and the second member 64 becomes smaller than the maximum distance (see FIG. 7(A) and FIG. 8).

(Example of Working Method for Holding Corrugated Cardboard Box W)

Next, an example of a working method for holding a corrugated cardboard box W by using the holding device 20A according to the above embodiment and the robot 10 including the holding device 20A will be described with reference to FIGS. 6 to 8. In the example of the working method, the case of repeatedly performing work of holding and transferring a corrugated cardboard box W located at the uppermost stage from a plurality of stacked corrugated cardboard boxes W by using the holding device 20A and the robot 10 including the holding device 20A, will be described. In order to avoid complication of appearance, the robot arm 12 is not shown in FIGS. 6 to 8.

Figure 6A:
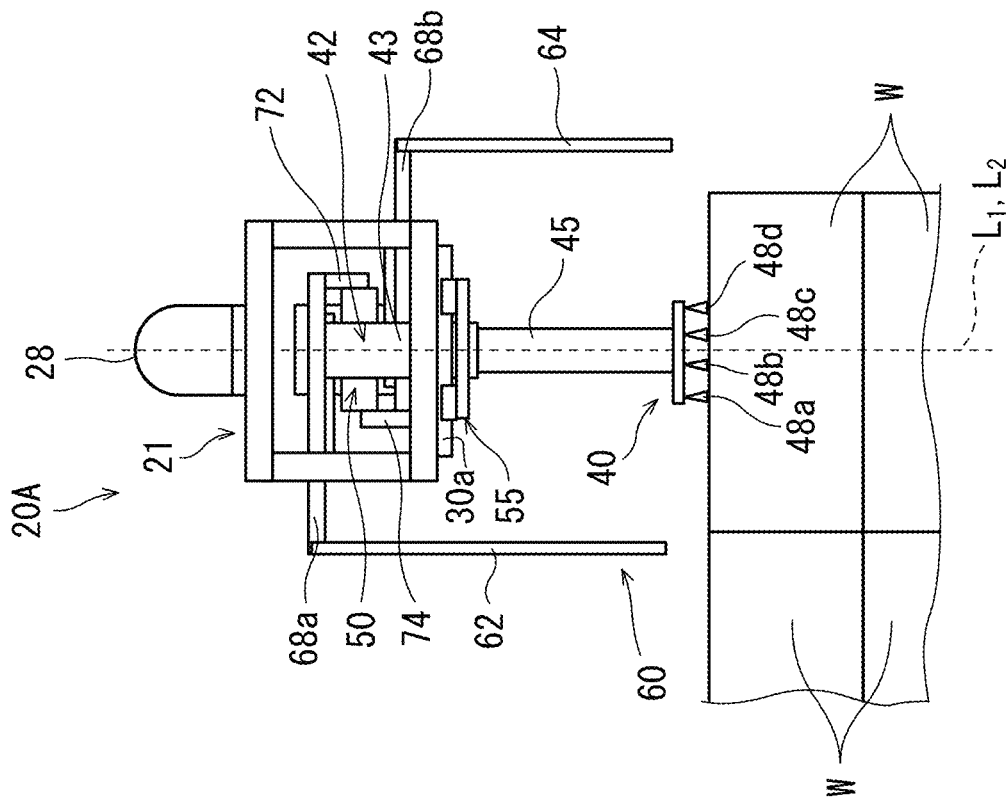
FIG. 6(A) is a diagram in which the holding device is positioned above the corrugated cardboard box.
Figure 6B:
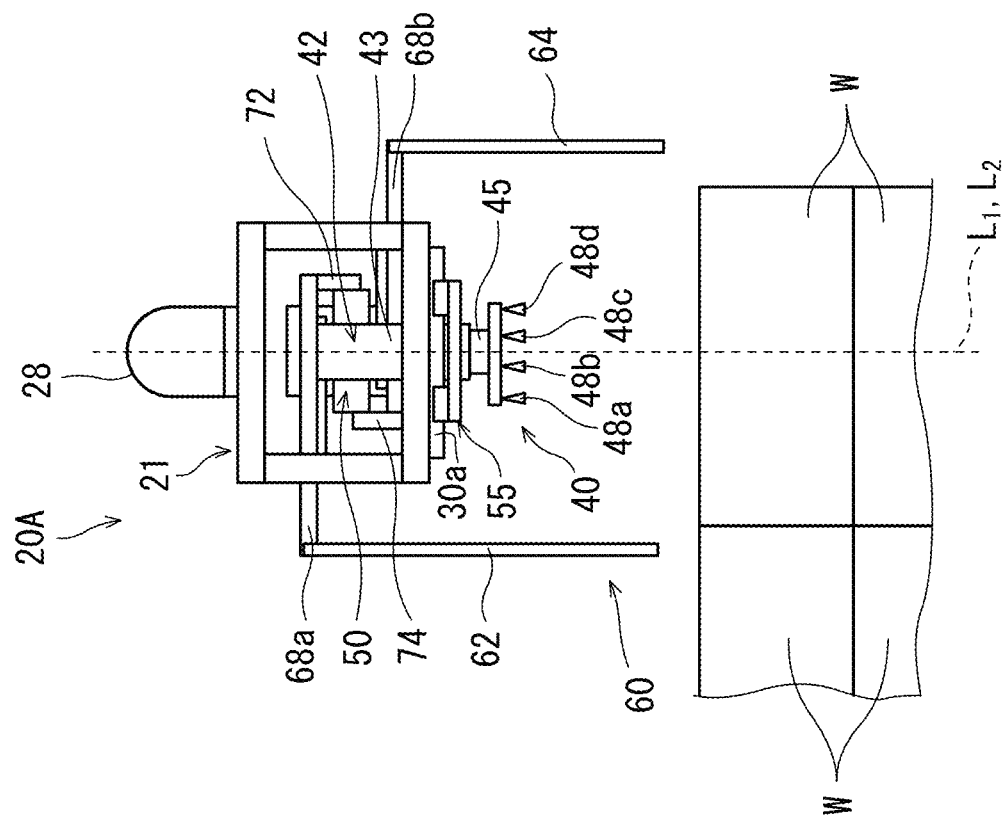
FIG. 6(B) is a diagram in which an air cylinder is extended and the corrugated cardboard box is sucked and held by a first holding mechanism after FIG. 6(A).

FIG. 6 illustrates schematic diagrams showing a state where work of holding a corrugated cardboard box by the holding device according to the above embodiment is performed, FIG. 6(A) is a diagram in which the holding device is positioned above the corrugated cardboard box, and FIG. 6(B) is a diagram in which the air cylinder is extended and the corrugated cardboard box is sucked and held by the first holding mechanism after FIG. 6(A).

First, as shown in FIG. 6(A), the holding device 20A is positioned above the corrugated cardboard box W by changing the posture of the robot arm 12. At this time, the posture of the robot arm 12 is changed such that the height direction of the holding device 20A is parallel to the vertical direction and the attachment part 28 attached to the robot arm 12 is positioned above the first member 62 and the second member 64.

At this time, the distal ends of the suction pads 48a to 48h are positioned on the proximal end side with respect to the respective distal ends of the first member 62 and the second member 64 by bringing the piston 45 of the air cylinder 42 into a retracted state. In addition, the posture of the robot arm 12 is changed such that the suction pads 48a to 48h face any one of corrugated cardboard boxes W at the uppermost stage in the height direction.

Furthermore, at this time, the corrugated cardboard box W is positioned within a range between the first member 62 and the second member 64 in the width direction by causing the distance between the first member 62 and the second member 64 to be the maximum distance. In addition, the to-be-held body 50 is held between the third member 72 and the fourth member 74 to position the first holding mechanism 40 at the center in the width direction of the base part 21 (that is, a central axis $L_1$ of the holding device 20A shown by an alternate long and short dash line in the drawing), by causing the distance between the first member 62 and the second member 64 to be the maximum distance. Therefore, in FIG.

6(A), the central axis $L_1$ of the holding device 20A and a central axis $L_2$ of the first holding mechanism 40 overlap each other.

In the example of the working method, the case where the central axis $L_1$ of the holding device 20A and the central axis $L_2$ of the first holding mechanism 40 are located on the right side with respect to a center line (not shown), of the corrugated cardboard box W to be held, extending in the height direction in the front view of the holding device 20A shown in FIG. 6, will be described. However, the present invention is not limited to this case, and the central axes $L_1$ and $L_2$ may be located on the left side with respect to the center line, of the corrugated cardboard box W, extending in the height direction, or may coincide with the center line. In such a case as well, it is possible to hold and transfer the corrugated cardboard box W by the same work method by using the holding device 20A and the robot 10 including the holding device 20A.

Next, as shown in FIG. 6(B), the piston 45 of the air cylinder 42 is extended downward to position the distal ends of the suction pads 48a to 48h on the distal end side with respect to the respective distal ends of the first member 62 and the second member 64 and bring the distal ends of the suction pads 48a to 48h into contact with the upper surface of the corrugated cardboard box W. Then, the suction pads 48a to 48h suck the upper surface of the corrugated cardboard box W with negative pressure to hold the corrugated cardboard box W. As described above, in the example of the working method, the corrugated cardboard box W at the uppermost stage is held by the first holding mechanism 40.

Figure 7A:
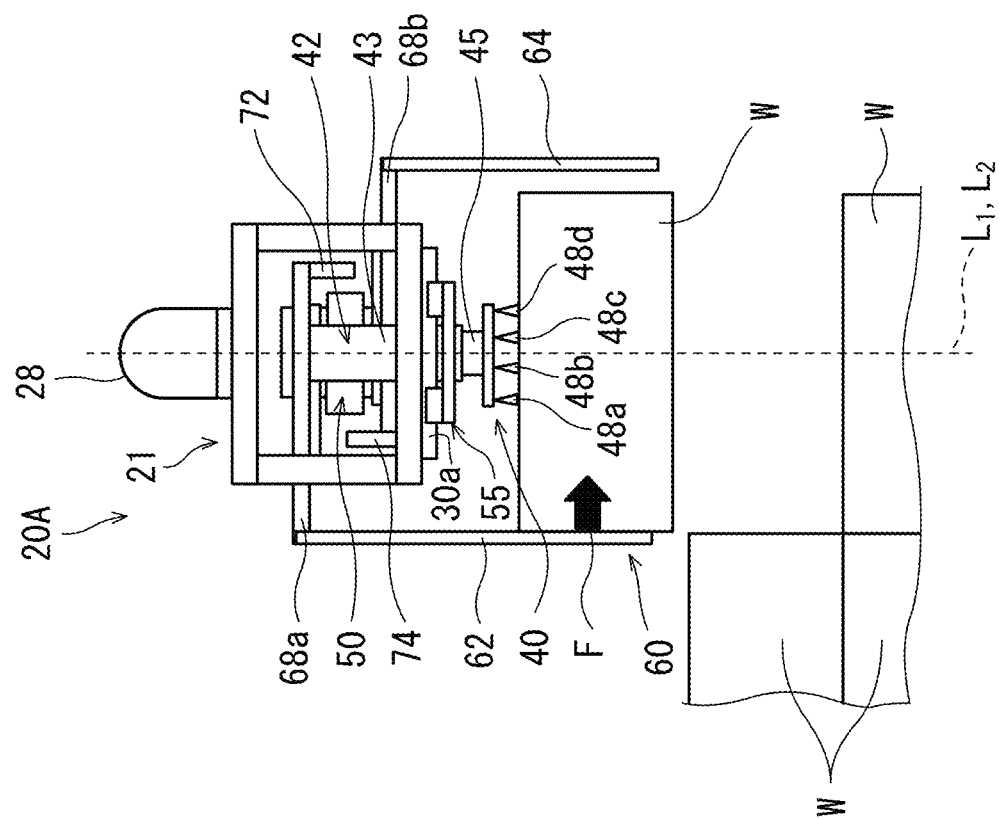
FIG. 7(A) is a diagram of a state where the air cylinder is retracted again after the corrugated cardboard box is sucked and held by the first holding mechanism.
Figure 7B:
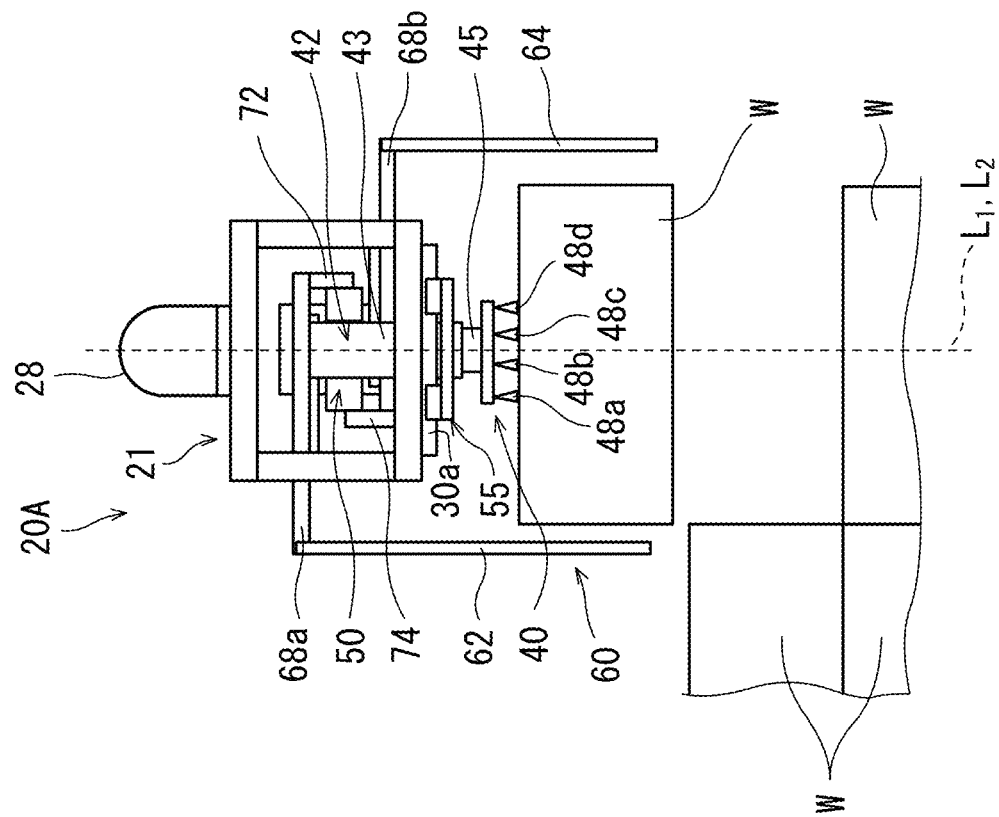
FIG. 7(B) is a diagram in which the distance between a first member and a second member is being decreased after FIG. 7(A).

FIG. 7 illustrates schematic diagrams showing a state where the work of holding the corrugated cardboard box by the holding device according to the above embodiment is performed, FIG. 7(A) is a diagram of a state where the air cylinder is retracted again after the corrugated cardboard box is sucked and held by the first holding mechanism, and FIG. 7(B) is a diagram in which the distance between the first member and the second member is being decreased after FIG. 7(A). In addition, FIG. 8 is a schematic diagram in which the work of holding the corrugated cardboard box by the holding device according to the above embodiment is completed.

As shown in FIG. 7(A), after the corrugated cardboard box W at the uppermost stage is held by the first holding mechanism 40, the distal ends of the suction pads 48a to 48h are positioned on the proximal end side with respect to the respective distal ends of the first member 62 and the second member 64, and the corrugated cardboard box W is positioned between the first member 62 and the second member 64, by bringing the piston 45 of the air cylinder 42 into a retracted state again.

Furthermore, as shown in FIG. 7(B), the distance between the first member 62 and the second member 64 is made smaller than the maximum distance by rotating the pinions 66 by the servomotor 61. An external force F along the width direction is applied to the first holding mechanism 40 via the corrugated cardboard box W by the first member 62 (either one of the first member and the second member), by bringing the air cylinder 42 into a retracted state after the first holding mechanism 40 holds the corrugated cardboard box W, and then decreasing the distance between the first member 62 and the second member 64, as described above. Then, the first holding mechanism 40 integrally moves with the first member 62 (the above either one of the members) and the corrugated cardboard box W while being guided by the guide members 30a and 30b which extend in the width direction.

Figure 8:
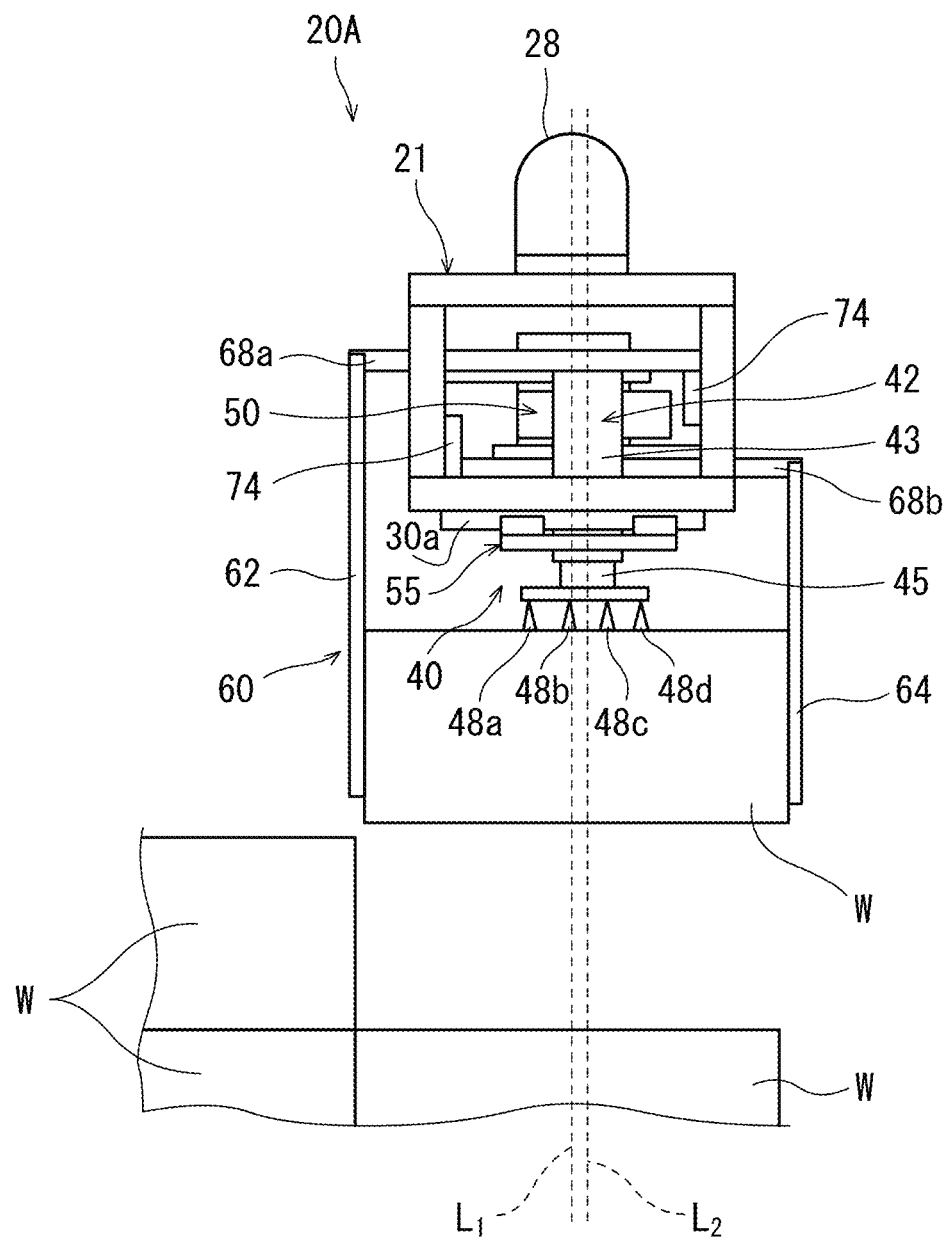
FIG. 8 is a schematic diagram in which the work of holding the corrugated cardboard box by the holding device according to the embodiment of the present invention is completed.

Then, as shown in FIG. 8, the central axis $L_2$ of the first holding mechanism 40 moves to the right side in the drawing, and the central axis $L_1$ of the holding device 20A and the center line, of the corrugated cardboard box W, extending in the height direction coincide with each other. Accordingly, the corrugated cardboard box W can be sandwiched and held between the first member 62 and the second member 64 (in other words, the corrugated cardboard box W can be sandwiched and held by the second holding mechanism 60).

As described above, in the example of the working method, by using the holding device 20A according to the above embodiment, the corrugated cardboard box W can be reliably held by the two holding mechanisms 40 and 60 (that is, the first holding mechanism 40 capable of sucking and holding a corrugated cardboard box W, and the second holding mechanism 60 capable of sandwiching and holding a corrugated cardboard box W).

Then, in the example of the working method, the corrugated cardboard box W sucked and sandwiched to be held by the holding device 20A can be transferred to another place by changing the posture of the robot arm 12. When releasing the corrugated cardboard box W that has been sucked and sandwiched to be held by the holding device 20A and transferred to the other place, the holding by sucking may be released and then the holding by sandwiching may be released, or the holding by sandwiching may be released and then the holding by sucking may be released, or the holding by sucking and the holding by sandwiching may be released at the same time.

Then, by repeating the above example of the working method, it is possible to repeatedly perform work of holding and transferring a corrugated cardboard box W located at the uppermost stage from a plurality of stacked corrugated cardboard boxes W by using the holding device 20A and the robot 10 including the holding device 20A.

(Advantageous Effects)

Here, for example, in the above robot hand of PTL 1, when the suction cup sucks a portion, of a workpiece, which is displaced from a center line thereof extending in the height direction to hold the workpiece, it is necessary to release once the workpiece held by the suction cup, set the suction cup at a correct position (that is, on the center line, of the workpiece, extending in the height direction), and then hold the workpiece again by the suction cup. That is, the above robot hand of PTL 1 needs to perform a complicated operation when holding a workpiece.

On the other hand, in the holding device 20A according to the above embodiment, regardless of which portion of the upper surface of a corrugated cardboard box W is sucked by the suction pads 48a to 48h to hold the corrugated cardboard box W (regardless of which portion of the workpiece is held by the first holding mechanism), the corrugated cardboard box W can be sandwiched and held by the second holding mechanism 60, by decreasing the distance between the first member 62 and the second member 64 while keeping a state where the corrugated cardboard box W is held by the first holding mechanism 40. In addition, since the corrugated cardboard box W is sucked and sandwiched to be held, the force for holding the corrugated cardboard box W can be improved as compared to that in the case where the corrugated cardboard box W is held by only either sucking or sandwiching. As a result, the holding device 20A according to the above embodiment is capable of reliably holding the corrugated cardboard box W with a simple operation.

Moreover, the holding device 20A according to the above embodiment causes the distance between the first member 62 and the second member 64 to be the maximum distance, and then performs work of holding a corrugated cardboard box W by the first holding mechanism 40, whereby it is possible to inhibit the first member 62 and the second member 64 from colliding against the corrugated cardboard box W while preventing the first holding mechanism 40 from moving in the width direction, since the first holding mechanism 40 has been positioned. Furthermore, after the corrugated cardboard box W is held by the first holding mechanism 40, the distance between the first member 62 and the second member 64 is made smaller than the maximum distance, whereby work of sandwiching and holding the corrugated cardboard box W between the first member 62 and the second member 64 can be performed while releasing the first holding mechanism 40 from the positioned state. Accordingly, it is possible to efficiently perform the work of sandwiching and holding the corrugated cardboard box W by the second holding mechanism 60 while keeping a state where the corrugated cardboard box W is held by the first holding mechanism 40.

Furthermore, in the above embodiment, the first holding mechanism 40 comes into contact with the upper surface of a corrugated cardboard box W and sucks and holds the corrugated cardboard box W, and the second holding mechanism 60 comes into contact with the right side surface and the left side surface of the corrugated cardboard box W and sandwiches and holds the corrugated cardboard box W therebetween. Accordingly, it is possible to more reliably hold a corrugated cardboard box W by the first holding mechanism 40 and the second holding mechanism 60 as compared to, for example, the case where: the first holding mechanism 40 comes into contact with the front surface of a corrugated cardboard box W and sucks and holds the corrugated cardboard box W; and the second holding mechanism 60 comes into contact with the bottom surface and the upper surface of the corrugated cardboard box W and sandwiches and holds the corrugated cardboard box W therebetween.

In the holding device 20A according to the above embodiment, when the air cylinder 42 is in a retracted state, the distal ends of the suction pads 48a to 48h are located on the proximal end side with respect to the respective distal ends of the first member 62 and the second member 64, and when the air cylinder 42 is in an extended state, the distal ends of the suction pads 48a to 48h are located on the distal end side with respect to the respective distal ends of the first member 62 and the second member 64. Accordingly, even when another corrugated cardboard box W (another object) exists adjacent to a corrugated cardboard box W as in the above embodiment, it is possible to reliably hold the corrugated cardboard box W with a simple operation without being hindered by the other corrugated cardboard box W (that is, while preventing the first member 62 and the second member 64 from colliding against the other corrugated cardboard box W).

(Modifications)

From the above description, various modifications and other embodiments of the present invention are apparent to a person skilled in the art. Therefore, the above description should be interpreted as being illustrative only, and is provided for the purpose of teaching the best mode for carrying out the present invention to a person skilled in the art. The details of the structures and/or the functions of the present invention may be substantially modified without departing from the spirit of the present invention.

Figure 9A:
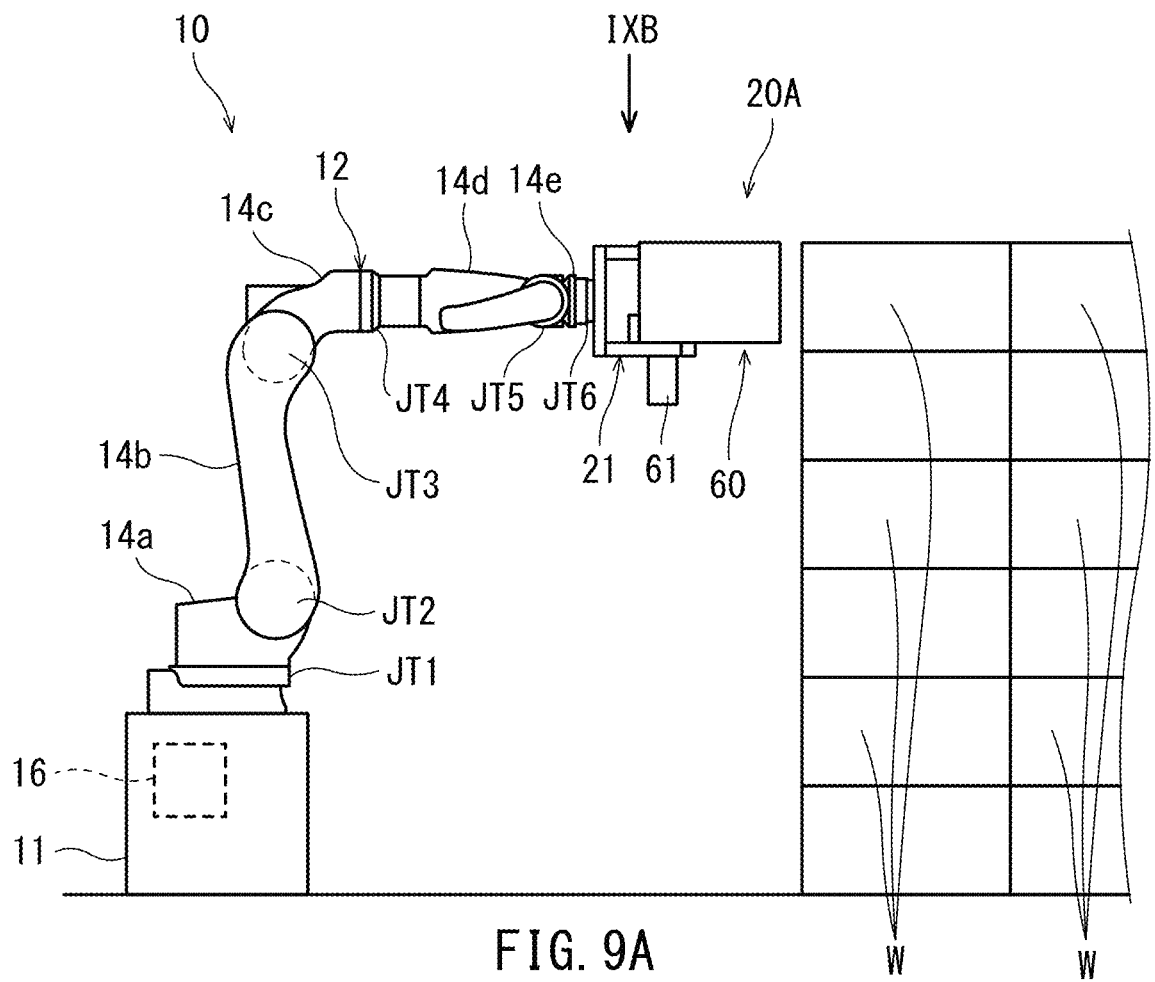
FIG. 9(A) is a side view showing the overall structure.
Figure 9B:
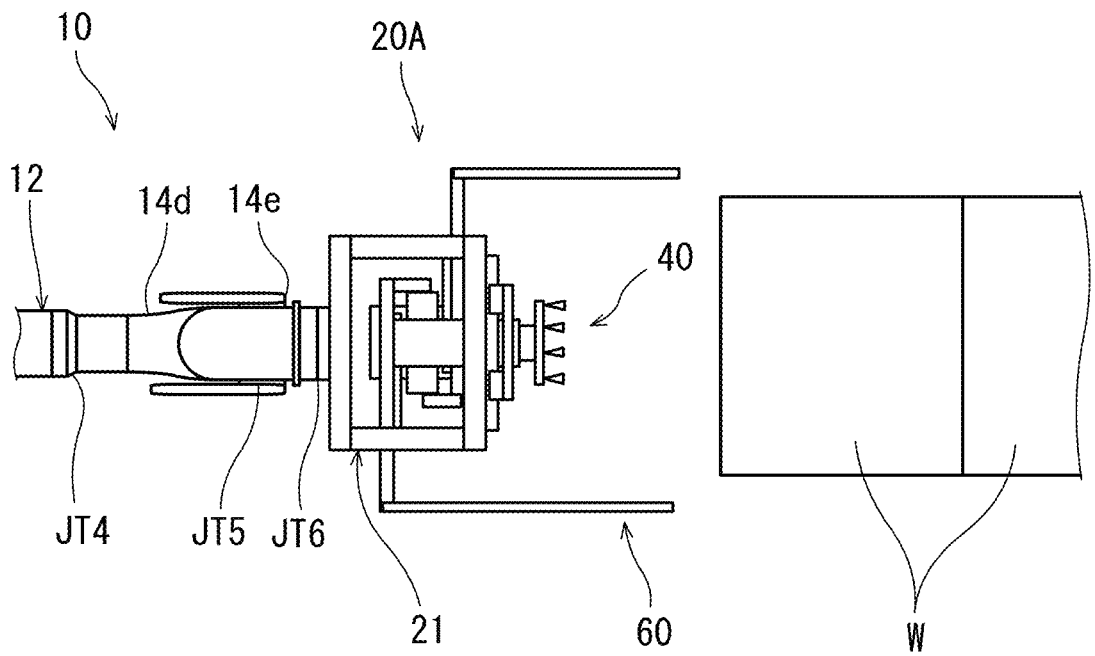
FIG. 9(B) is a view as seen in the direction of an arrow IXB shown in FIG. 9(A).

Another mode of work of holding a corrugated cardboard box by the holding device according to the above embodiment will be described with reference to FIG. 9. FIG. 9 illustrates schematic diagrams showing a state where work of holding a corrugated cardboard box by the holding device according to the above embodiment is performed in another mode, FIG. 9(A) is a side view showing the overall structure, and FIG. 9(B) is a view as seen in the direction of an arrow IXB shown in FIG. 9(A).

In the above embodiment, the case where the first holding mechanism 40 sucks the upper surface of a corrugated cardboard box W (workpiece) to hold the corrugated cardboard box W, and the second holding mechanism 60 comes into contact with the right side surface and the left side surface of the corrugated cardboard box W and sandwiches and holds the corrugated cardboard box W, has been described. However, the present invention is not limited to this case, and, for example, as shown in FIG. 9, by rotating the joint shaft JT6 by 90° from the state shown in FIG. 1, the first holding mechanism 40 may suck the front surface of a corrugated cardboard box W to hold the corrugated cardboard box W, and the second holding mechanism 60 may come into contact with the right side surface and the left side surface of the corrugated cardboard box W and sandwich and hold the corrugated cardboard box W.

Alternatively, for example, after the robot arm 12 and the holding device 20 are set to be in the same posture as in FIG. 1, the first holding mechanism 40 may suck the front surface of a corrugated cardboard box W to hold the corrugated cardboard box W, and the second holding mechanism 60 may come into contact with the bottom surface and the upper surface of the corrugated cardboard box W and sandwich and hold the corrugated cardboard box W.

(First Modification)

Figure 10:
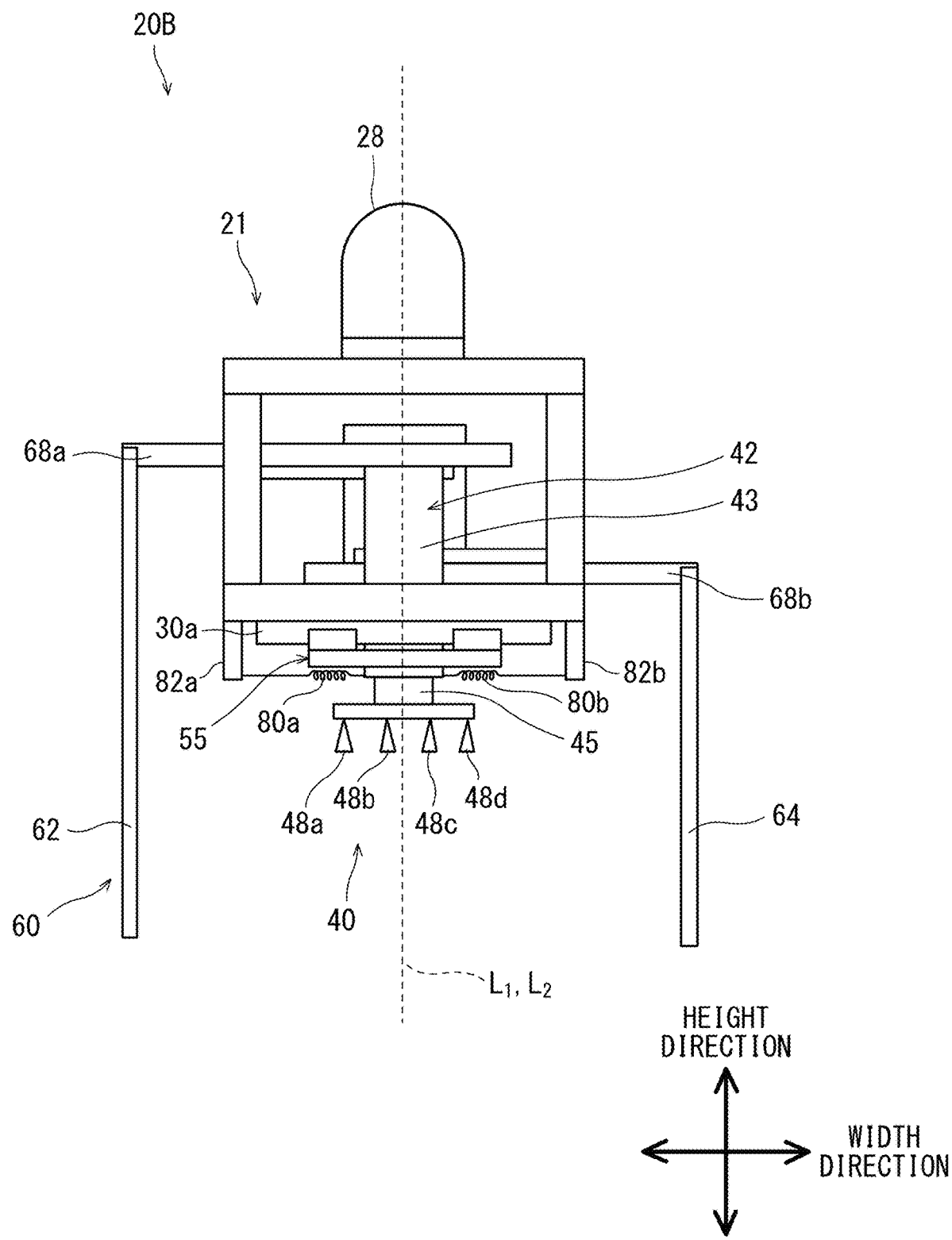
FIG. 10 is a front view showing a first modification of the holding device according to the embodiment of the present invention.

A first modification of the holding device 20A according to the above embodiment will be described with reference to FIG. 10. FIG. 10 is a front view showing the first modification of the holding device according to the above embodiment. A holding device 20B according to the present modification has the same configuration as the holding device 20A according to the above embodiment, except that the holding device 20B includes spring members 80a and 80b (elastic bodies) and spring fixing members 82a and 82b instead of the to-be-held body 50, the third member 72, and the fourth member 74. Therefore, the same parts are denoted by the same reference characters, and the same description is not repeated.

As shown in FIG. 10, the holding device 20B according to the present modification further includes the spring fixing member 82a which extends downward from a right end portion of the bottom surface of the base part 21 (portion located on the left side of the sheet of FIG. 10 in the front view of FIG. 10), and the spring member 80a which is mounted at one end thereof on a left end portion of the spring fixing member 82a and mounted at another end thereof on a right end portion of the distal end portion of the cylinder body 43.

Also, the holding device 20B according to the present modification further includes the spring fixing member 82b which extends downward from a left end portion of the bottom surface of the base part 21 (portion located on the right side of the sheet of FIG. 10 in the front view of FIG. 10), and the spring member 80b which is mounted at one end thereof on a right end portion of the spring fixing member 82b and mounted at another end thereof on a left end portion of the distal end portion of the cylinder body 43.

In the present modification, the spring members 80a and 80b have the same shape and the same spring constant. When no external force is applied to the first holding mechanism 40, the first holding mechanism 40 is pulled toward the first member 62 side by an elastic force generated by the spring member 80a trying to contract. In addition, the first holding mechanism 40 is also pulled toward the second member 64 side by an elastic force generated by the spring member 80b trying to contract.

When no external force is applied to the first holding mechanism 40, the elastic force generated by the spring member 80a trying to contract and the elastic force generated by the spring member 80b trying to contract are balanced. Therefore, at this time, the first holding mechanism 40 is positioned at the center in the width direction of the base part 21 (that is, a central axis $L_1$ of the holding device 20B shown by an alternate long and short dash line in the drawing). Therefore, in FIG. 10, the central axis $L_1$ of the holding device 20B and the central axis $L_2$ of the first holding mechanism 40 overlap each other.

Next, an example of a working method for holding a corrugated cardboard box W by using the holding device 20B according to the above modification and a robot including the holding device 20B will be described with reference to FIG. 11. FIG. 11 illustrates schematic diagrams showing a state where work of holding a corrugated cardboard box by the first modification of the holding device according to the above embodiment is performed, FIG. 11(A) is a diagram in which the distance between the first member and the second member is being decreased, and FIG. 11(B) is a diagram in which the work of holding the corrugated cardboard box by the holding device is completed.

In the example of the working method, a procedure from sucking and holding a corrugated cardboard box W by the first holding mechanism 40 to bringing the air cylinder 42 into a retracted state is the same as the example, of the working method using the holding device 20A, described with reference to FIGS. 6 to 8. Therefore, the same description and illustration are not repeated. In addition, in order to avoid complication of appearance, the robot arm is not shown in FIG. 11.

Figure 11B:
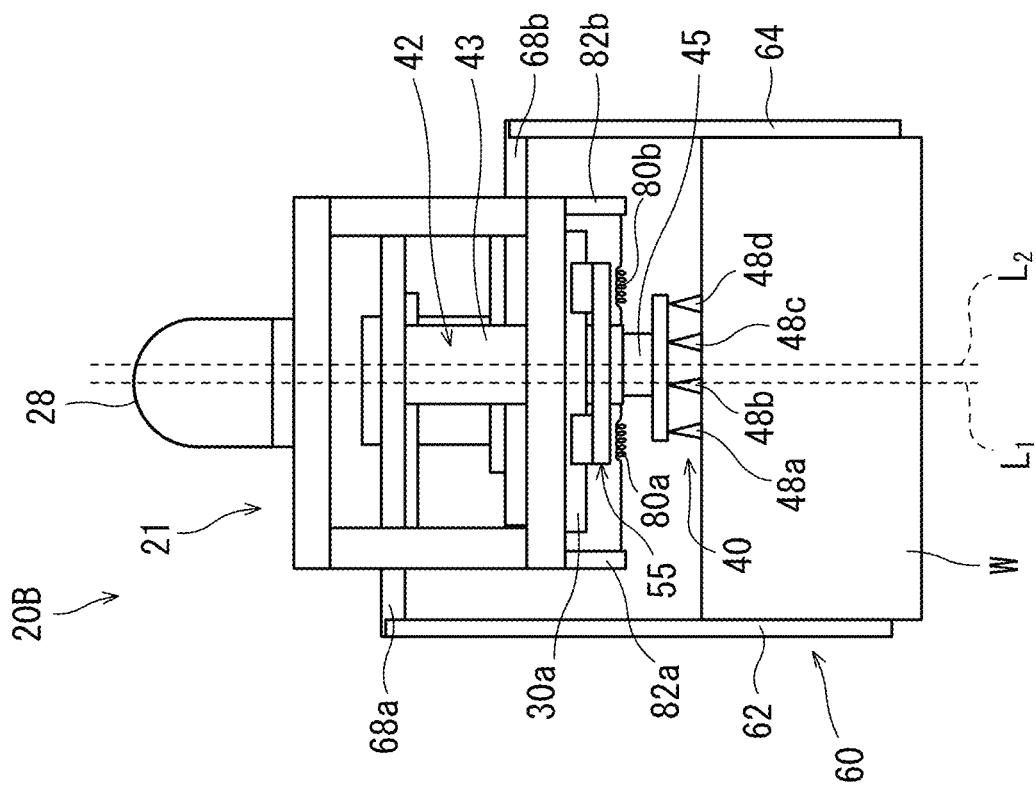
FIG. 11(B) is a diagram in which the work of holding the corrugated cardboard box by the holding device is completed.
Figure 11A:
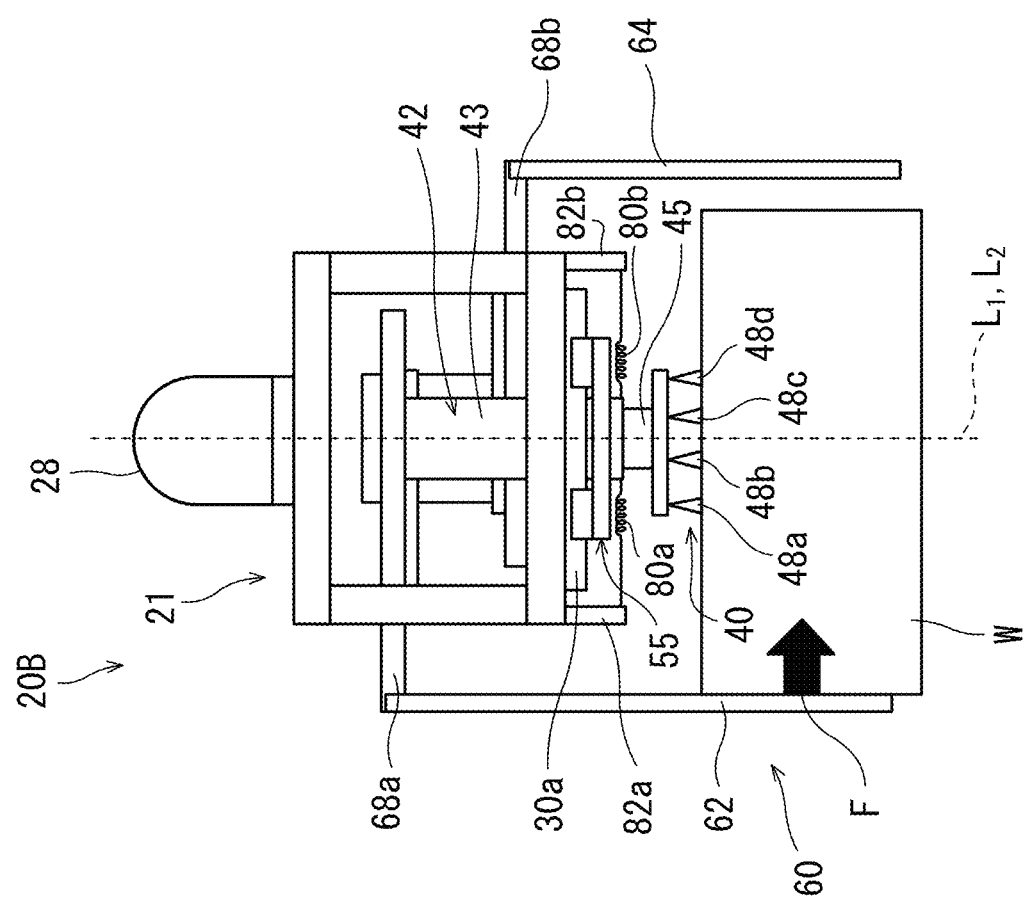
FIG. 11(A) is a diagram in which the distance between a first member and a second member is being decreased.

As shown in FIG. 11(A), after the first holding mechanism 40 holds the corrugated cardboard box W, the air cylinder 42 is brought into a retracted state, and then the distance between the first member 62 and the second member 64 is decreased, whereby an external force F along the width direction is applied to the first holding mechanism 40 via the corrugated cardboard box W by the first member 62 (either one of the first member and the second member). Then, the first holding mechanism 40 integrally moves with the first member 62 (the above either one of the members) and the corrugated cardboard box W, while being guided by the guide members 30a and 30b which extend in the width direction, against the elastic force generated by the spring member 80a trying to contract.

Then, as shown in FIG. 11(B), the central axis $L_2$ of the first holding mechanism 40 moves to the right side in the drawing, and the central axis $L_1$ of the holding device 20B and the center line, of the corrugated cardboard box W, extending in the height direction coincide with each other. Accordingly, the corrugated cardboard box W can be sandwiched and held between the first member 62 and the second member 64 (in other words, the corrugated cardboard box W can be sandwiched and held by the second holding mechanism 60).

Due to the above, even in the case where the holding device 20B according to the above first modification is used (in other words, even when the spring members 80a and 80b are included instead of the to-be-held body 50, the third member 72, and the fourth member 74), similar to the case where the holding device 20A according to the above embodiment is used, it is possible to prevent the first holding mechanism 40 from moving in the width direction, since the first holding mechanism 40 has been positioned. In addition, it is possible to efficiently perform work of sandwiching and holding the corrugated cardboard box W by the second holding mechanism 60 while keeping a state where the corrugated cardboard box W is held by the first holding mechanism 40.

(Second Modification)

Figure 12A:
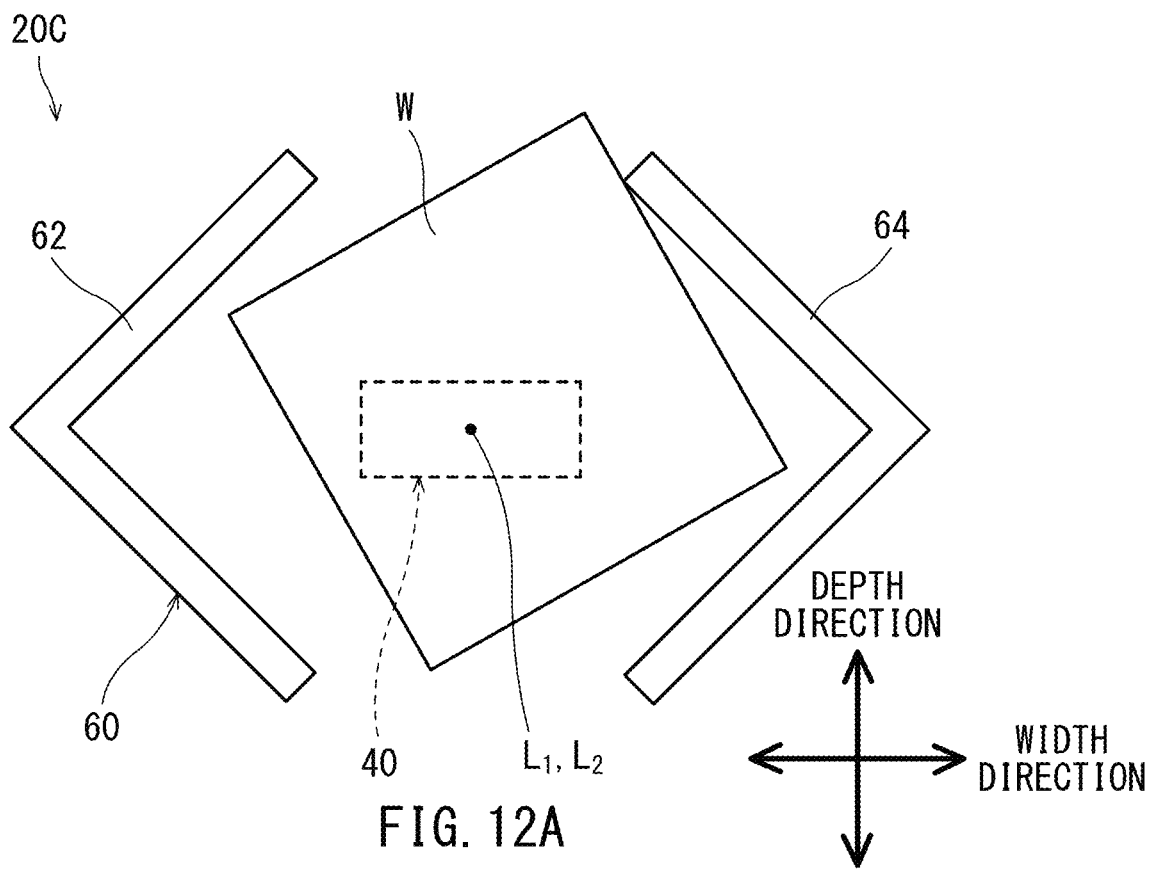
FIG. 12(A) is a diagram in which the distance between a first member and a second member is being decreased.
Figure 12B:
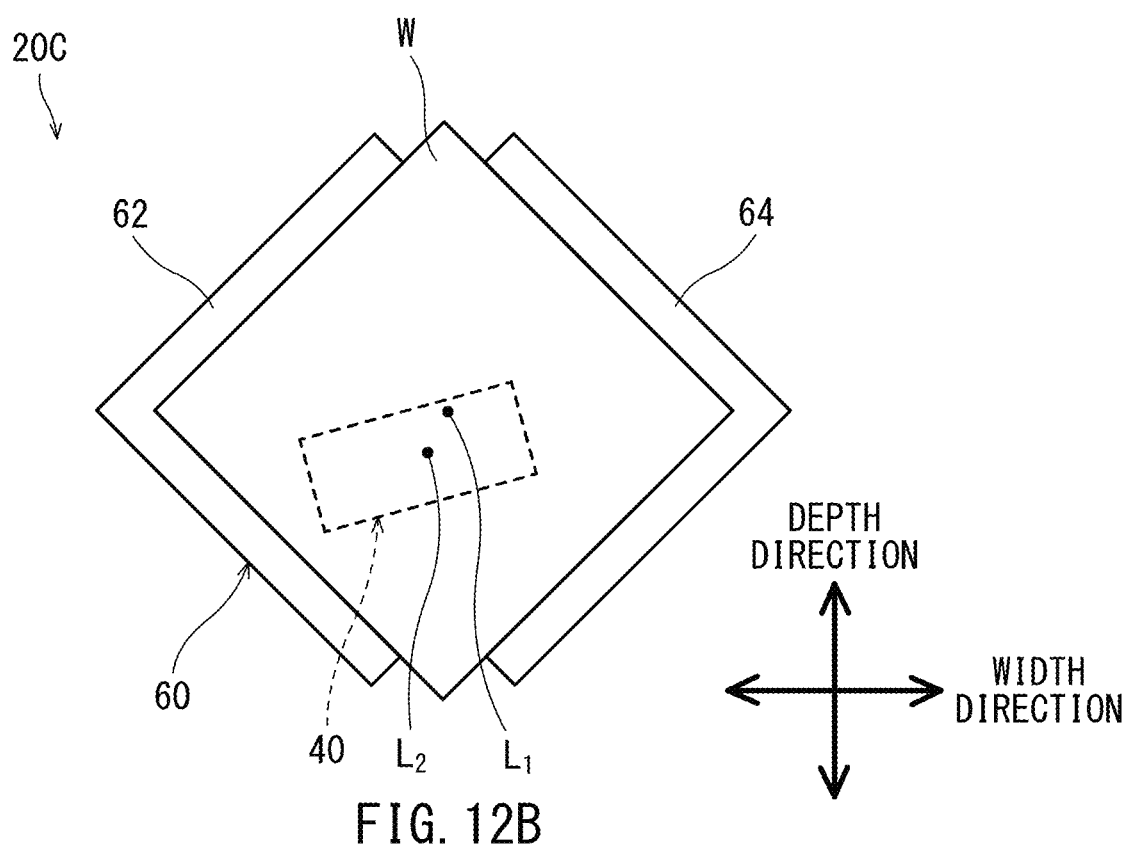
FIG. 12(B) is a diagram in which the work of holding the corrugated cardboard box by the holding device is completed.

A second modification of the holding device 20A according to the above embodiment will be described with reference to FIG. 12. FIG. 12 illustrates schematic diagrams of a state where work of holding a corrugated cardboard box by the second modification of the holding device according to the above embodiment is performed, as seen from the distal end side of the holding device, FIG. 12(A) is a diagram in which the distance between the first member and the second member is being decreased, and FIG. 12(B) is a diagram in which the work of holding the corrugated cardboard box by the holding device is completed. A holding device 20C according to the present modification has the same configuration as the holding device 20A according to the above embodiment, except for the structures of guide members 30, the first holding mechanism 40, the first member 62, and the second member 64. Therefore, the same parts are denoted by the same reference characters, and the same description is not repeated.

As shown in FIG. 12, in the present modification, each of the first member 62 and the second member 64 is formed in an L-shape when viewed from the distal end side of the holding device 20C. In addition, in the present modification, a plurality of guide members 30 are provided so as to be arranged in a grid pattern (not shown). Since the plurality of guide members 30 are arranged as described above, the first holding mechanism 40 shown by a broken line in FIG. 12 is movable in the depth direction in addition to the width direction (first direction), while being guided by the plurality of guide members 30, by an external force being applied thereto. In addition, in the present modification, the first holding mechanism 40 is rotatable about an axis, of the first holding mechanism 40, extending in the height direction (in other words, the axis of the air cylinder 42) as a rotation axis.

By having the above configuration, the holding device 20C according to the present modification can perform work of holding a corrugated cardboard box W, in the following mode. In this working method, a procedure from sucking and holding a corrugated cardboard box W by the first holding mechanism 40 to bringing the air cylinder 42 into a retracted state is the same as the example of the working method described with reference to FIGS. 6 to 8. Therefore, the same description and illustration are not repeated.

As shown in FIG. 12(A), after the first holding mechanism 40 holds the corrugated cardboard box W, the air cylinder 42 is brought into a retracted state, and then the distance between the first member 62 and the second member 64 is decreased, whereby an external force is applied to the first holding mechanism 40 via the corrugated cardboard box W by the second member 64 (either one of the first member and the second member).

Then, as shown in FIG. 12(B), as the distance between the first member 62 and the second member 64 becomes smaller, the corrugated cardboard box W is guided by the respective inner surfaces of the first member 62 and the second member 64, and the position and the posture of the corrugated cardboard box W are corrected, so that a central axis $L_1$ of the holding device 20C and a center line (not shown), of the corrugated cardboard box W, extending in the height direction coincide with each other. Accordingly, the corrugated cardboard box W can be sandwiched and held between the first member 62 and the second member 64 (in other words, the corrugated cardboard box W can be sandwiched and held by the second holding mechanism 60).

While the corrugated cardboard box W is guided by the respective inner surfaces of the first member 62 and the second member 64, an external force is applied to the first holding mechanism 40 via the corrugated cardboard box W from the first member 62 and the second member 64. By the external force being applied to the first holding mechanism 40 as described above, the first holding mechanism 40 moves in the depth direction in addition to the width direction (first direction), and rotates about the axis, of the first holding mechanism 40, extending in the height direction as a rotation axis, while keeping a state where the first holding mechanism 40 sucks the upper surface of the corrugated cardboard box W to hold the corrugated cardboard box W.

As described above, the first holding mechanism 40 transitions from the state shown in FIG. 12(A) (that is, a state where the axis, of the first holding mechanism 40, extending in the height direction coincides with the central axis $L_1$ of the holding device 20C) to the state shown in FIG. 12(B) (that is, a state where the axis, of the first holding mechanism 40, extending in the height direction is displaced from the central axis $L_1$ of the holding device 20C).

(Third Modification)

Figure 13:
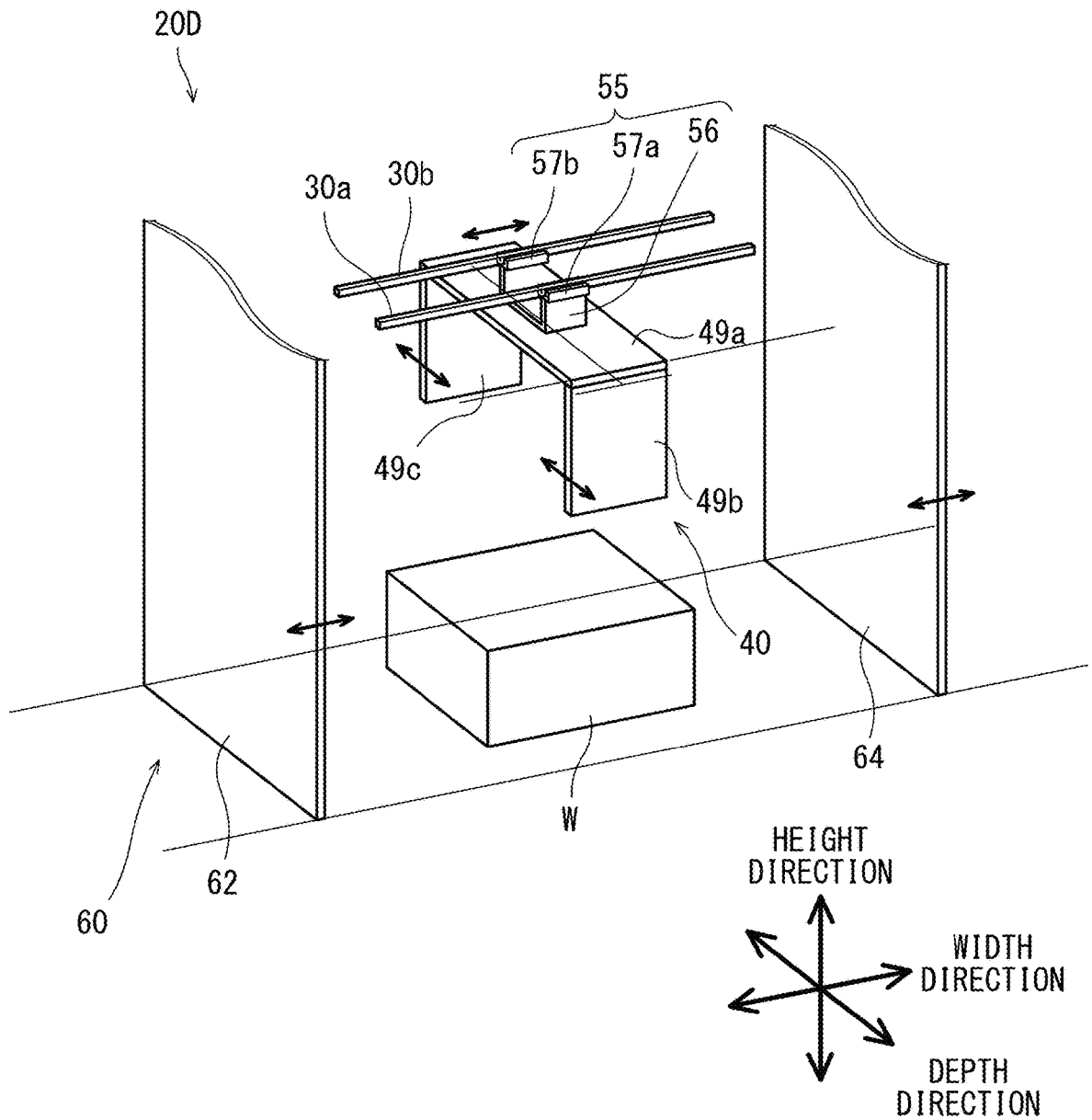
FIG. 13 is a schematic diagram showing a state where work of holding a corrugated cardboard box by a fourth modification of the holding device according to the embodiment of the present invention is performed.

A third modification of the holding device 20A according to the above embodiment will be described with reference to FIG. 13. FIG. 13 is a schematic diagram showing a state where work of holding a corrugated cardboard box by the fourth modification of the holding device according to the above embodiment is performed. A holding device 20D according to the present modification has the same configuration as the holding device 20A according to the above embodiment, except for the structure of the first holding mechanism 40. Therefore, the same parts are denoted by the same reference characters, and the same description is not repeated.

In the present modification, the first holding mechanism 40 includes a base member 49*a* which is formed in a plate shape, and sliding pieces 49*b* and 49*c* each of which is formed in a plate shape and slidably mounted on the base member 49*a*. The base member 49*a* is disposed between the first member 62 and the second member 64 in the width direction such that the longitudinal direction of a main surface thereof coincides with the depth direction of the holding device 20D, the width direction of the main surface thereof coincides with the width direction of the holding device 20D, and the thickness direction thereof coincides with the height direction of the holding device 20D.

The base member 49*a* has a main member 56 provided at a center portion of the upper surface thereof. The main member 56 includes: a first portion which is fixed to the center portion of the upper surface of the base member 49*a*; a second portion which extends in the height direction from one end edge in the longitudinal direction of the first portion which coincides with the depth direction of the holding device 20D; and a third portion which extends in the height direction from another end edge in the longitudinal direction of the first portion.

The sliding member 57*a* is mounted on the distal end of the second portion of the base member 49*a* so as to be slidable relative to the guide member 30*a* which extends in the width direction of the holding device 20D. In addition, the sliding member 57*b* is mounted on the distal end of the third portion of the base member 49*a* so as to be slidable relative to the guide member 30*b* which extends in the width direction of the holding device 20D.

Each of the sliding pieces 49*b* and 49*c* is mounted on the bottom surface of the base member 49*a* such that the longitudinal direction of a main surface thereof coincides with the height direction of the holding device 20D, the width direction of the main surface thereof coincides with the width direction of the holding device 20D, and the thickness direction thereof coincides with the depth direction of the holding device 20D. In the present modification, the first holding mechanism 40 is capable of sandwiching and holding a corrugated cardboard box W between the sliding pieces 49*b* and 49*c* by changing the distance between the sliding pieces 49*b* and 49*c* in the depth direction of the holding device 20D by a servomotor (not shown). The operation of the servomotor may be controlled by the robot control device 16 (not shown in FIG. 13).

As described above, the first holding mechanism 40 is not limited to sucking and holding a corrugated cardboard box W (workpiece) with negative pressure, and may be capable of sandwiching and holding the corrugated cardboard box W. In this case, the first holding mechanism 40 is preferably capable of sandwiching and holding a corrugated cardboard box W in the depth direction which is orthogonal to the width direction (first direction) in which the second holding mechanism 60 sandwiches the corrugated cardboard box W, as in the present modification. The present invention is not limited to the above case, and the first holding mechanism 40 may be capable of holding a workpiece by piercing the workpiece, or may be capable of holding a workpiece in another mode.

(Other Modifications)

In the above embodiment, the case where the holding device 20A sucks and sandwiches a corrugated cardboard box W (workpiece) to hold the corrugated cardboard box W has been described. Accordingly, for example, even for a workpiece that is wrapped in a bubble wrap and thus not suitable to be sucked or a workpiece that has a complicated shape and thus is not suitable to be sandwiched, the holding device 20A according to the above embodiment not only sandwiches the workpiece but also sucks the workpiece to hold the workpiece, so that it is possible to reliably hold the workpiece. However, the present invention is not limited to this case, and the holding device according to the present invention can be used while being switched between holding by sucking and holding by sandwiching.

In the above embodiment, the case where the base part 21 is formed in a hollow rectangular parallelepiped shape and an opening is formed in each of the five surfaces other than the upper surface of the rectangular parallelepiped shape has been described. However, the present invention is not limited to this case, and, for example, the base part may have a structure including a hexagonal bottom plate and top plate having the same shape and size when viewed in the thickness direction, and four columns extending in the height direction so as to connect the bottom plate and the top plate, or may have another structure.

In the above embodiment and first modification, the case where the first holding mechanism 40 is positioned at the center in the width direction of the base part 21 in a state where no external force is applied thereto has been described. However, the present invention is not limited to this case, and the first holding mechanism 40 may be positioned at a position shifted from the center in the width direction of the base part 21, in a state where no external force is applied thereto. In addition, the first holding mechanism 40 may not necessarily be positioned. Accordingly, the configuration for positioning the first holding mechanism 40 becomes unnecessary, so that it is possible to simplify the structure of the holding device.

In the above embodiment and the modifications thereof, the case where the extending and retracting part is configured as the air cylinder 42 has been described. However, the present invention is not limited to this case, and, for example, the extending and retracting part may be configured as a linear motion mechanism that is driven by a servomotor so as to perform extending and retracting motion in the height direction, or may be configured as another mechanism.

In the above embodiment and the modifications thereof, the case where the robot control device 16 determines that work of sandwiching and holding a corrugated cardboard box W between the first member 62 and the second member 64 is completed, when a current value included in a feedback value from the servomotor 61 becomes larger than the predetermined current value, has been described. However, the present invention is not limited to this case, and, for example, an external force sensor for detecting an external force applied to the first member 62 may be mounted on the first member 62, a similar external force sensor may also be mounted on the second member 64, and the robot control device 16 may determine that work of sandwiching and holding a corrugated cardboard box W between the first member 62 and the second member 64 is completed, on the basis of detection values of these external force sensors.

A sensor other than the external force sensor (for example, a contact sensor or the like) may be mounted on each of the first member 62 and the second member 64, and the robot control device 16 may determine that work of sandwiching and holding a corrugated cardboard box W between the first member 62 and the second member 64 is completed, on the basis of detection values of the sensors.

Moreover, the external force sensor or the sensor other than the external force sensor does not have to be provided to each of the first member 62 and the second member 64, and may be provided to at least either one of the first member 62 and the second member 64. The robot control device 16 may determine that the work of sandwiching and holding a corrugated cardboard box W between the first member 62 and the second member 64 is completed, on the basis of the sensor provided to at least either one of the first member 62 and the second member 64.

In the above embodiment and the modifications thereof, the case where the holding devices 20A to 20D are each configured as the hand of the robot 10 for holding and transferring a corrugated cardboard box W (workpiece) having a rectangular parallelepiped shape, has been described. However, the present invention is not limited to this case, and, for example, the holding device according to the present invention may be configured as a hand of a robot for holding and transferring a corrugated cardboard box having a cubic shape, a polygonal column shape other than a quadrangular column shape, a circular column shape, or another shape, or may be configured as a hand of a robot for holding and transferring a workpiece having no predetermined shape (for example, food such as fried chicken and shaomai, rocks, etc.), or may be configured as a hand of a robot for holding and transferring another workpiece.

In the above embodiment and the modifications thereof, the case where the first holding mechanism 40 is slidable in the width direction while being guided by the guide members 30a and 30b, since the first holding mechanism 40 has the sliding body 55, has been described. However, the present invention is not limited to this case, and the first holding mechanism may have a wheel instead of the sliding body 55, and may be movable in the width direction while being guided by a guide member, by the wheel moving in the width direction while being guided by the guide member, or the first holding mechanism may be movable in the width direction while being guided by the guide member in another mode.

In the above embodiment and the modifications thereof, the case where after the first holding mechanism 40 holds a corrugated cardboard box W, the air cylinder 42 is brought into a retracted state and then the distance between the first member 62 and the second member 64 is decreased, has been described. However, the present invention is not limited to this case, and, after the first holding mechanism 40 holds a corrugated cardboard box W, while the air cylinder 42 is brought into a retracted state, the distance between the first member 62 and the second member 64 may be decreased such that the first member 62 and the second member 64 do not collide against the corrugated cardboard box W.

In the above embodiment and the modifications thereof, the case where the holding devices 20A to 20D are each configured as the hand of the robot 10 which is a vertical articulated robot has been described. However, the present invention is not limited to this case, and, for example, the holding device according to the present invention may be configured as a hand of a horizontal articulated robot, may be configured as a hand of a polar coordinate robot, may be configured as a hand of a cylindrical coordinate robot, may be configured as a hand of a Cartesian coordinate robot, or may be configured as a hand of another robot.

In the above embodiment and the modifications thereof, the case where the holding devices 20A to 20D are each configured as the hand of the robot 10 has been described. However, the present invention is not limited to this case, and, for example, the holding device according to the present invention may be used in a state where the holding device is suspended from a ceiling so as to be movable along the ceiling, or may be used in another mode.

The invention claimed is:

1. A holding device for holding a workpiece, comprising:
   a base part;
   a guide member mounted on the base part and extending in a first direction;
   a first holding mechanism movable in the first direction, while being guided by the guide member, by an external force being applied thereto, the first holding mechanism being capable of holding the workpiece;
   a second holding mechanism including a first member and a second member which face each other across the first holding mechanism in the first direction and each of which is movable relative to the base part by being driven by an actuator, the second holding mechanism being capable of sandwiching and holding the workpiece between the first member and the second member by changing a distance between the first member and the second member in the first direction;
   a third member integrally movable with the first member and disposed between the first holding mechanism and the second member in the first direction; and
   a fourth member integrally movable with the second member and disposed between the first holding mechanism and the first member in the first direction, wherein
   when the distance between the first member and the second member is a maximum distance, the third and fourth members position the first holding mechanism in the first direction by holding the first holding mechanism, and
   when the distance between the first member and the second member becomes smaller than the maximum distance, the third and fourth members release the first holding mechanism from the positioned state.

2. The holding device according to claim 1, wherein
the first holding mechanism is capable of coming into contact with an upper portion of the workpiece and holding the workpiece, and
the second holding mechanism is capable of sandwiching and holding the workpiece by bringing the first member into contact with a first portion, of a side portion of the workpiece, located on one side in the first direction, and bringing the second member into contact with a second portion, of the side portion of the workpiece, located on another side in the first direction.

3. The holding device according to claim 1, wherein the first holding mechanism is capable of sucking and holding the workpiece with negative pressure.

4. The holding device according to claim 1, wherein
the first holding mechanism includes an extending and retracting part capable of extending and retracting in a second direction orthogonal to the first direction, and a holding part, provided at a distal end of the extending and retracting part, for holding the workpiece, and
the first holding mechanism is configured such that when the extending and retracting part is in a retracted state, a distal end of the holding part is located on a proximal end side with respect to distal ends of the first and second members, and when the extending and retracting part is in an extended state, the distal end of the holding part is located on a distal end side with respect to the distal ends of the first and second members.

5. A robot comprising:
the holding device according to claim 1; and
a robot arm including at least one joint shaft and having a distal end at which the holding device is provided.

6. The robot according to claim 5, wherein
a first servomotor for rotationally driving the at least one joint shaft is provided at the at least one joint shaft,
the actuator for driving the first and second members is configured as a second servomotor, and
the robot further comprises a robot control device for servo-controlling the first and second servomotors.

\* \* \* \* \*